(12) United States Patent
Jenista et al.

(10) Patent No.: US 11,267,027 B2
(45) Date of Patent: Mar. 8, 2022

(54) NONFERROUS EXTRUSION HANDLING SYSTEMS AND PROCESSES

(71) Applicant: Granco Clark, Inc., Belding, MI (US)

(72) Inventors: David Rolston Jenista, Belmont, MI (US); Scott David Buiten, Belding, MI (US); Jeffrey Allen Ferman, Belding, MI (US)

(73) Assignee: GRANCO CLARK, INC., Belding, MI (US)

( * ) Notice: Subject to any disclaimer, the term of this patent is extended or adjusted under 35 U.S.C. 154(b) by 344 days.

(21) Appl. No.: 16/709,057

(22) Filed: Dec. 10, 2019

(65) Prior Publication Data
US 2021/0170460 A1    Jun. 10, 2021

(51) Int. Cl.
| B21B 15/00 | (2006.01) |
| B21B 3/00 | (2006.01) |
| B65G 13/02 | (2006.01) |
| B65G 47/64 | (2006.01) |
| B65G 15/12 | (2006.01) |
| B65G 47/54 | (2006.01) |

(52) U.S. Cl.
CPC ............ B21B 15/00 (2013.01); B21B 3/00 (2013.01); B65G 13/02 (2013.01); B65G 15/12 (2013.01); B65G 47/54 (2013.01); B65G 47/642 (2013.01); B65G 47/643 (2013.01); *B21B 2003/001* (2013.01); *B21B 2015/0078* (2013.01)

(58) Field of Classification Search
CPC ...... B65G 15/12; B65G 13/02; B65G 47/642; B65G 13/065; B65G 47/54; B65G 47/643; B21B 15/00; B21B 3/00; B21B 2015/0078; B21B 2003/001
USPC .................. 198/782, 370.09, 371.3, 468.6; 193/35 SS
See application file for complete search history.

(56) References Cited

U.S. PATENT DOCUMENTS

| | | | | |
|---|---|---|---|---|
| 3,680,677 A | * | 8/1972 | Branch | B65G 49/067 198/369.6 |
| 3,739,619 A | * | 6/1973 | Follrath | B21C 35/02 72/255 |
| 3,921,789 A | * | 11/1975 | Goldinger | B65G 47/54 198/369.6 |
| 4,593,807 A | * | 6/1986 | Cattaneo | B21B 39/004 198/457.01 |
| 4,715,766 A | * | 12/1987 | Gebhardt | B65G 1/0485 414/392 |
| 4,790,167 A | | 12/1988 | Gentry et al. | |
| 4,953,381 A | | 9/1990 | Visser | |
| 5,031,436 A | | 7/1991 | Visser | |
| 5,126,945 A | | 6/1992 | Jenista et al. | |
| 5,165,268 A | | 11/1992 | Visser | |

(Continued)

*Primary Examiner* — James R Bidwell
(74) *Attorney, Agent, or Firm* — Warner Norcross + Judd LLP

(57) ABSTRACT

The specification discloses a nonferrous extrusion system and process providing improved transfer of extrusions from the runout table to the cooling table. The runout table includes interleaved runout rollers and transfer rollers that are vertically shiftable with respect to one another. The transfer rollers additionally are horizontally shiftable between the runout table and the cooling table. The runout table receives extrusions in a longitudinal direction. The vertical and horizontal shifting of the rollers is controlled to transfer the extrusions from the runout table to the cooling table.

15 Claims, 23 Drawing Sheets

(56) References Cited

U.S. PATENT DOCUMENTS

| 6,361,265 B1 * | 3/2002 | Mahoney | B65G 57/10 |
| | | | 414/497 |
| 2005/0115798 A1 * | 6/2005 | Evans | B65G 47/54 |
| | | | 198/370.09 |

* cited by examiner

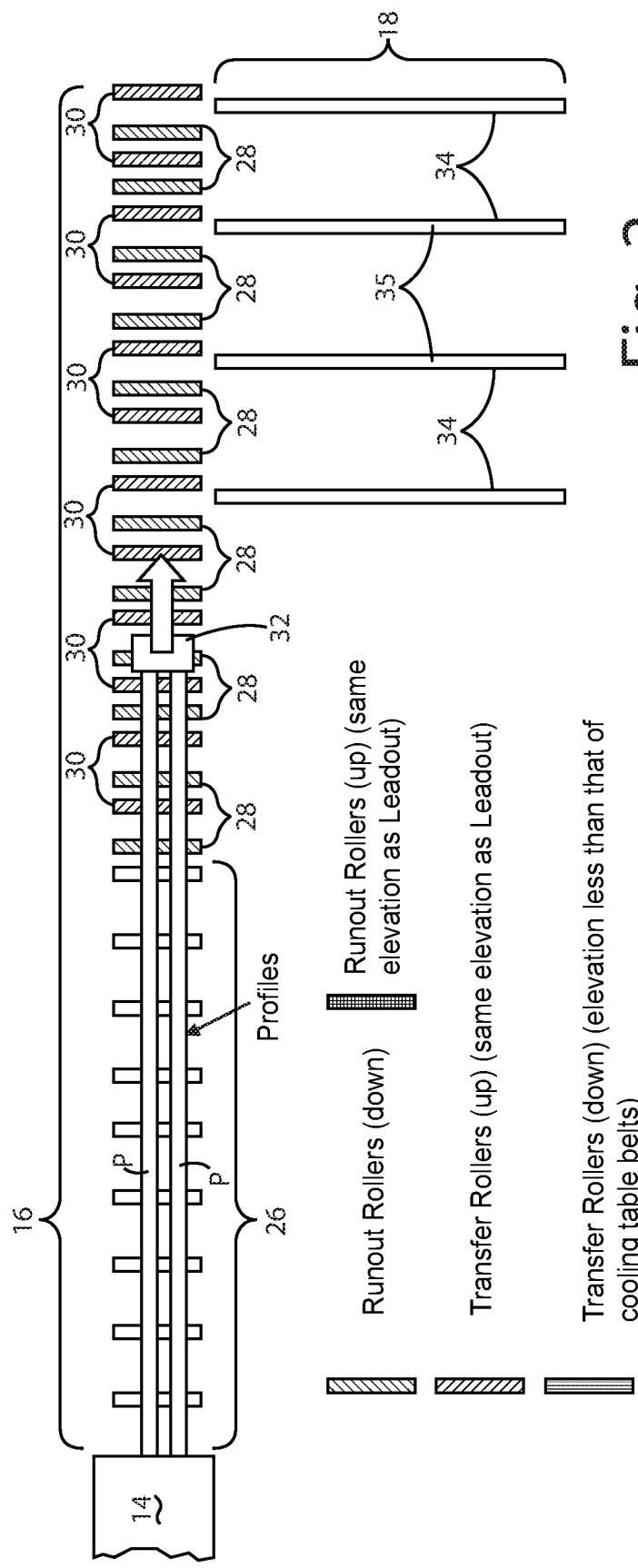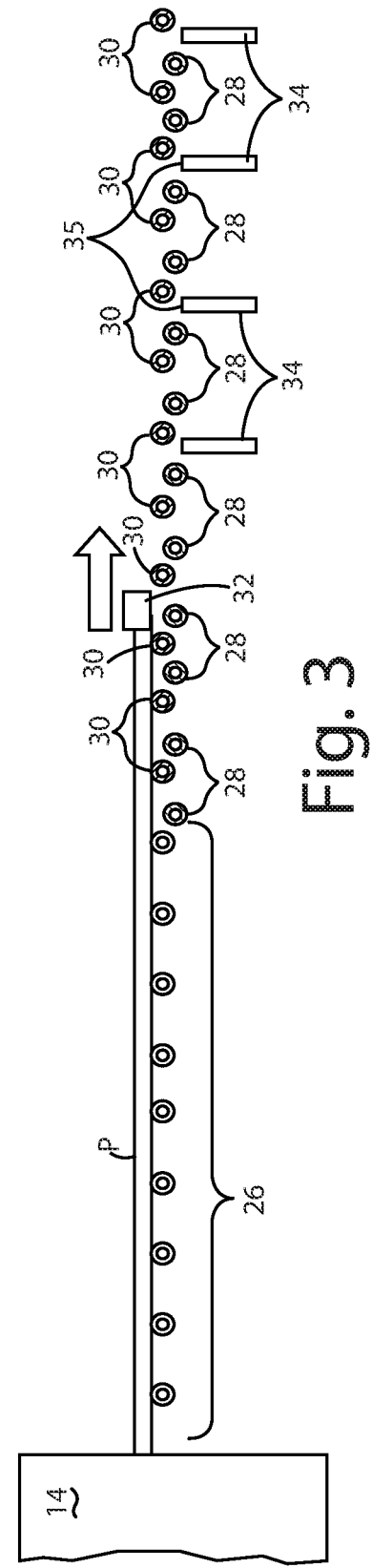

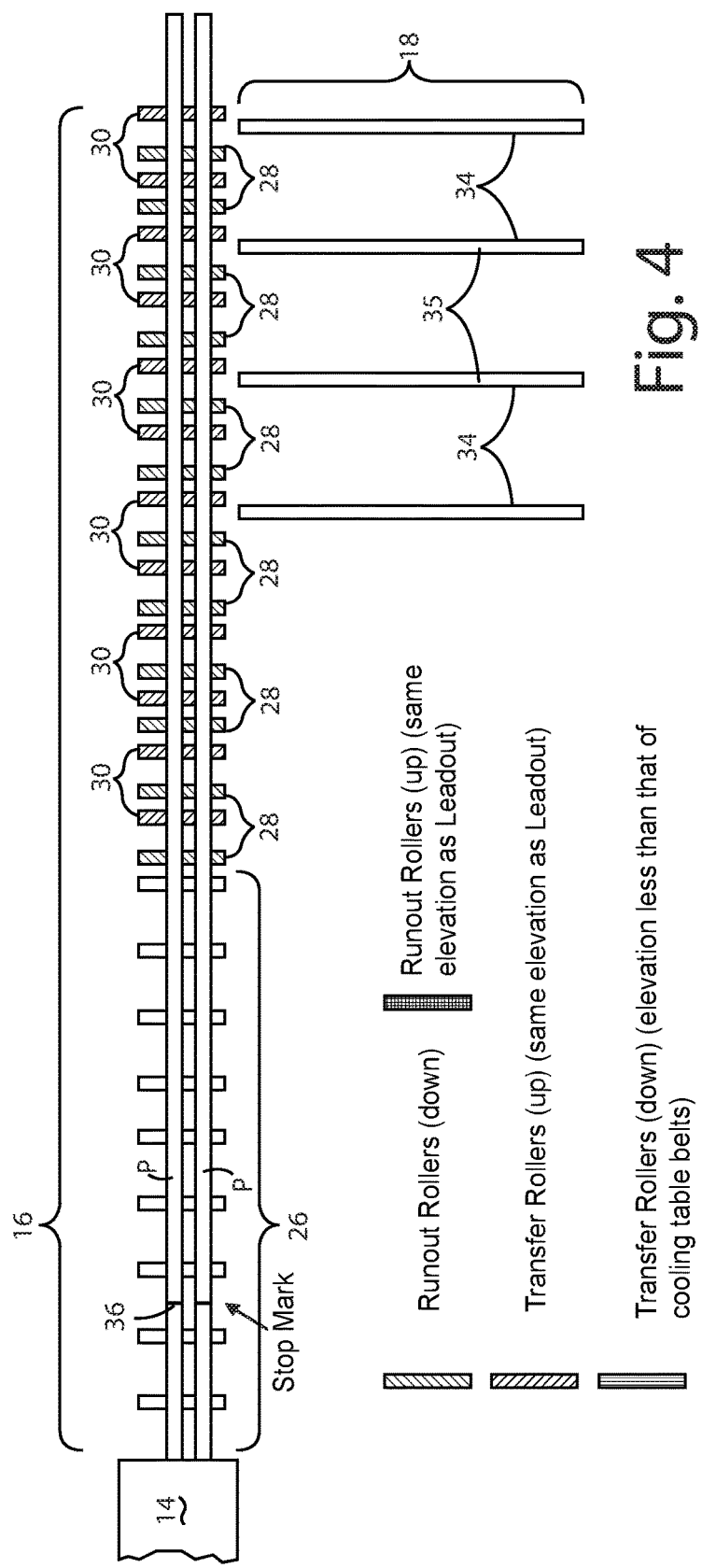
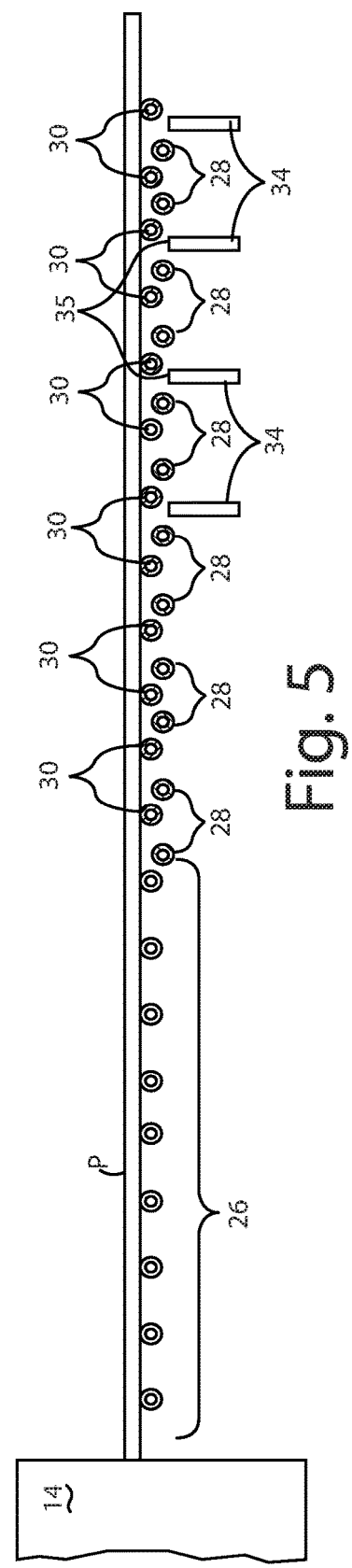

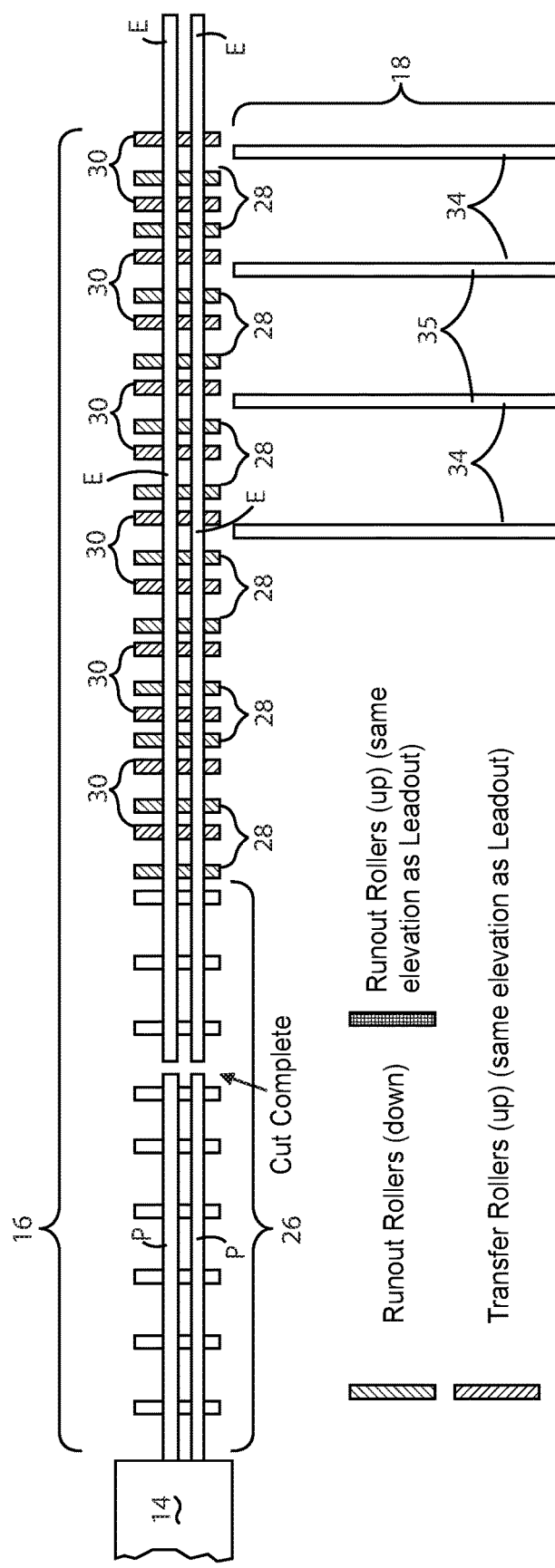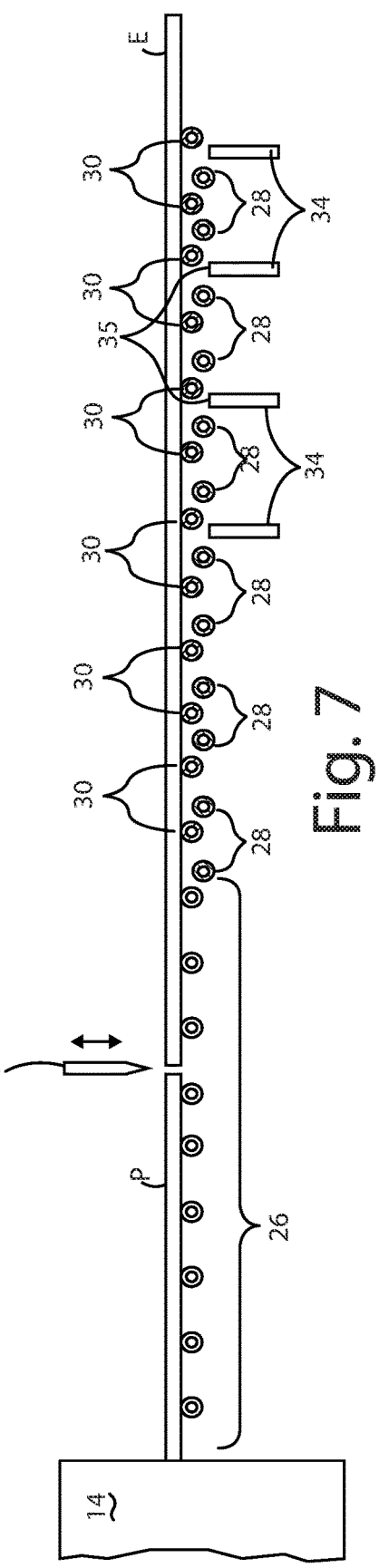

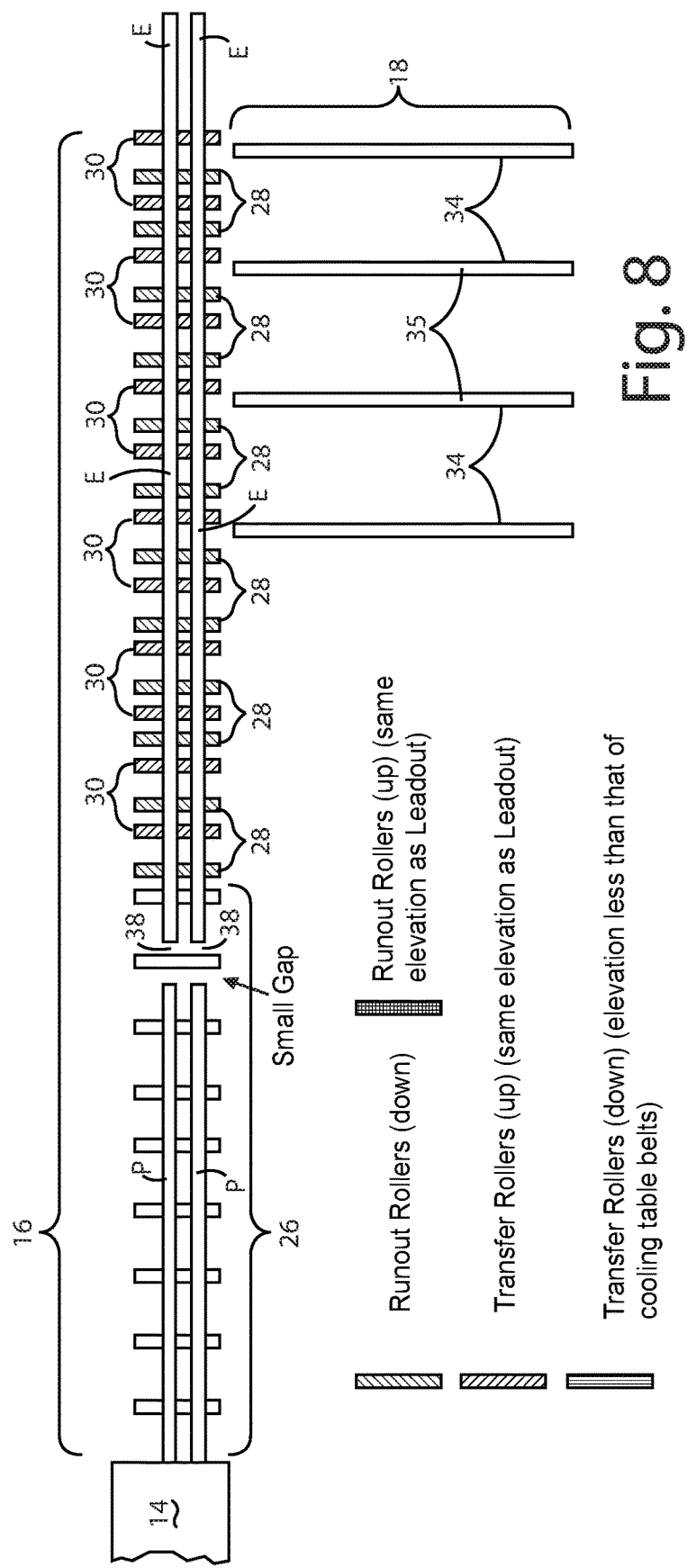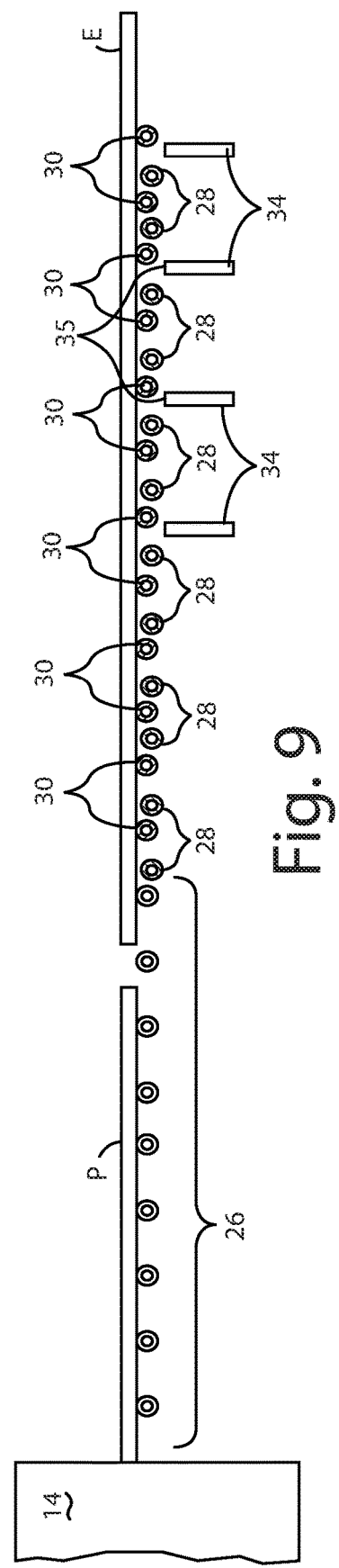

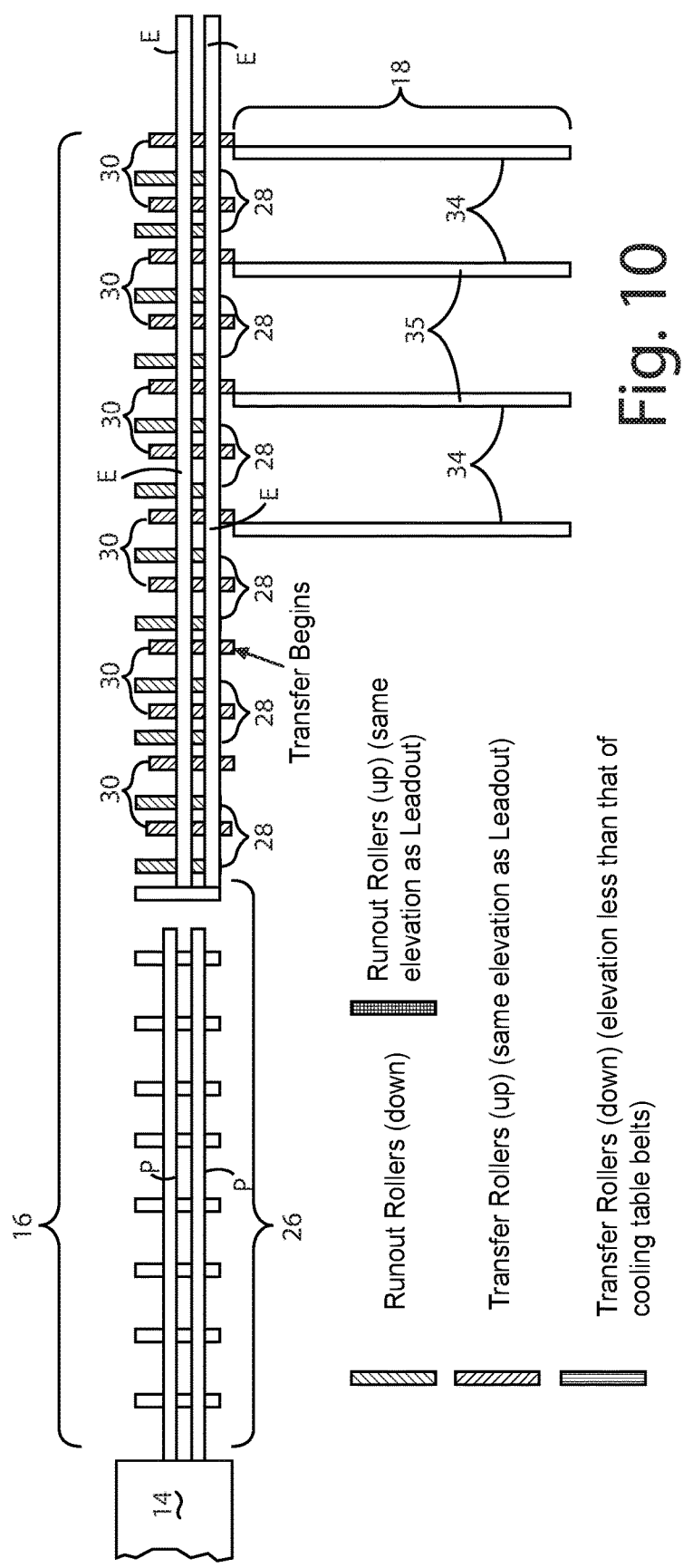
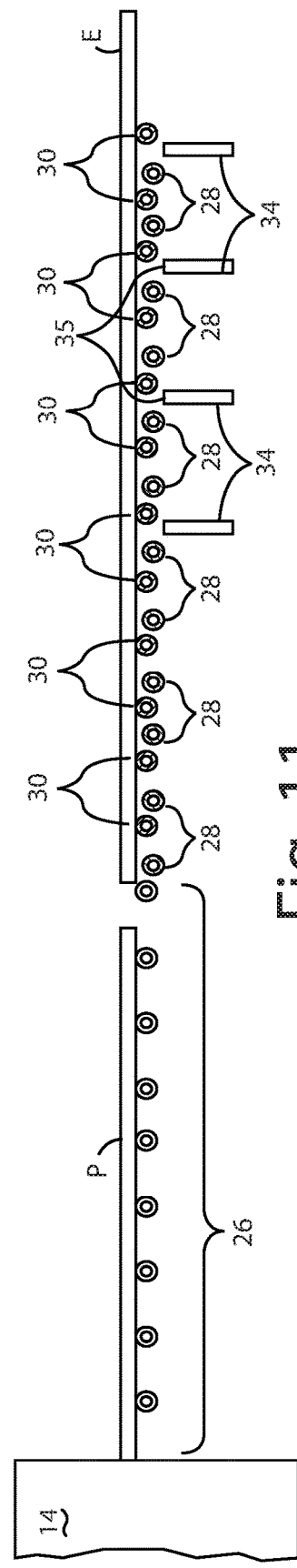

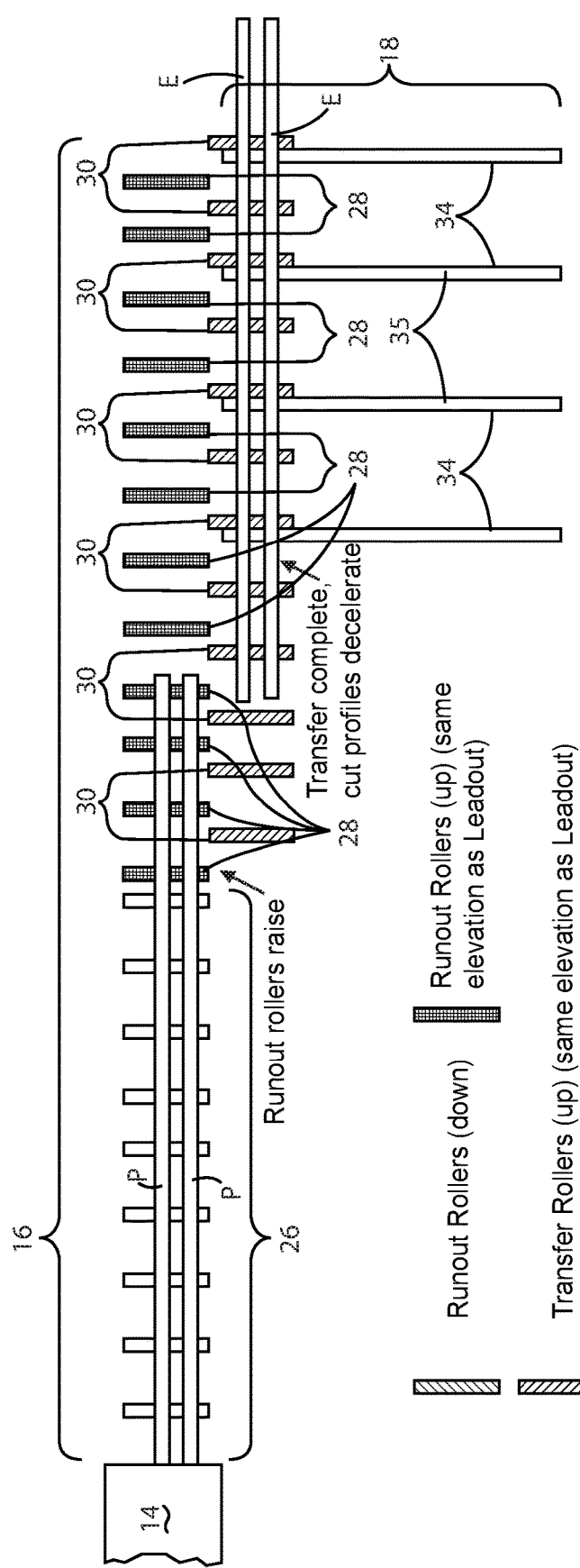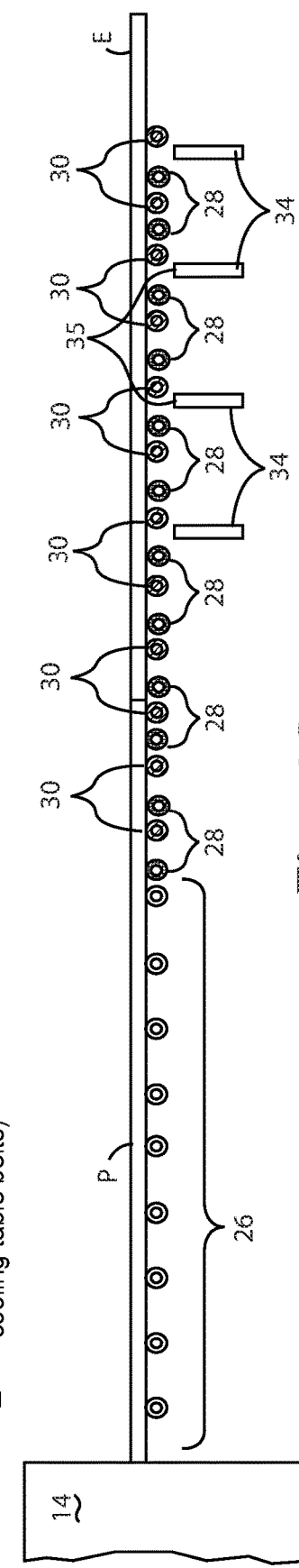
Fig. 12
Fig. 13

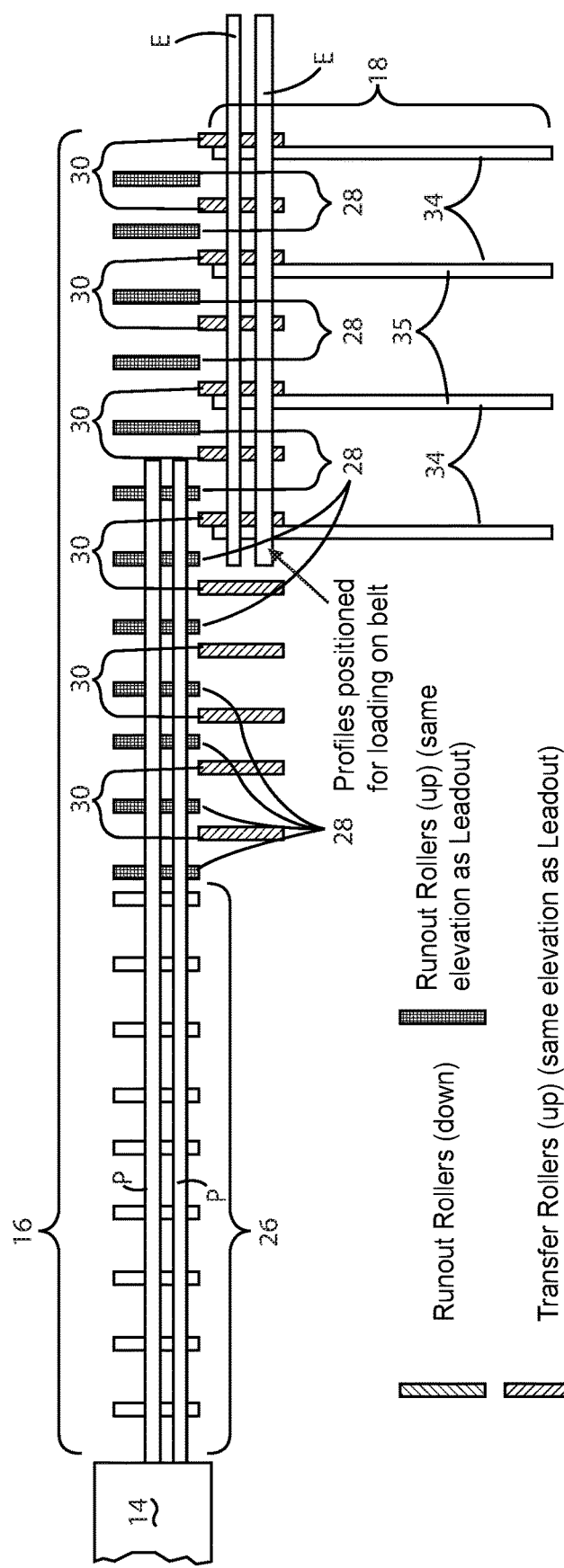
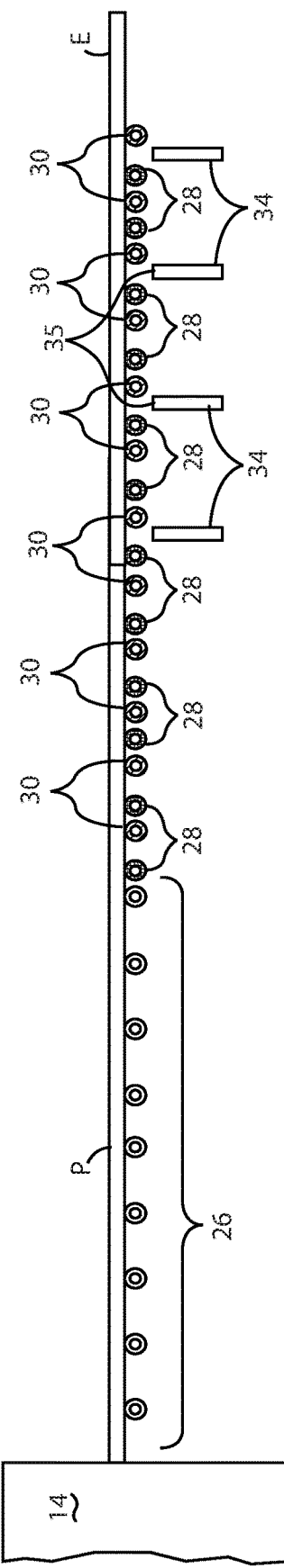

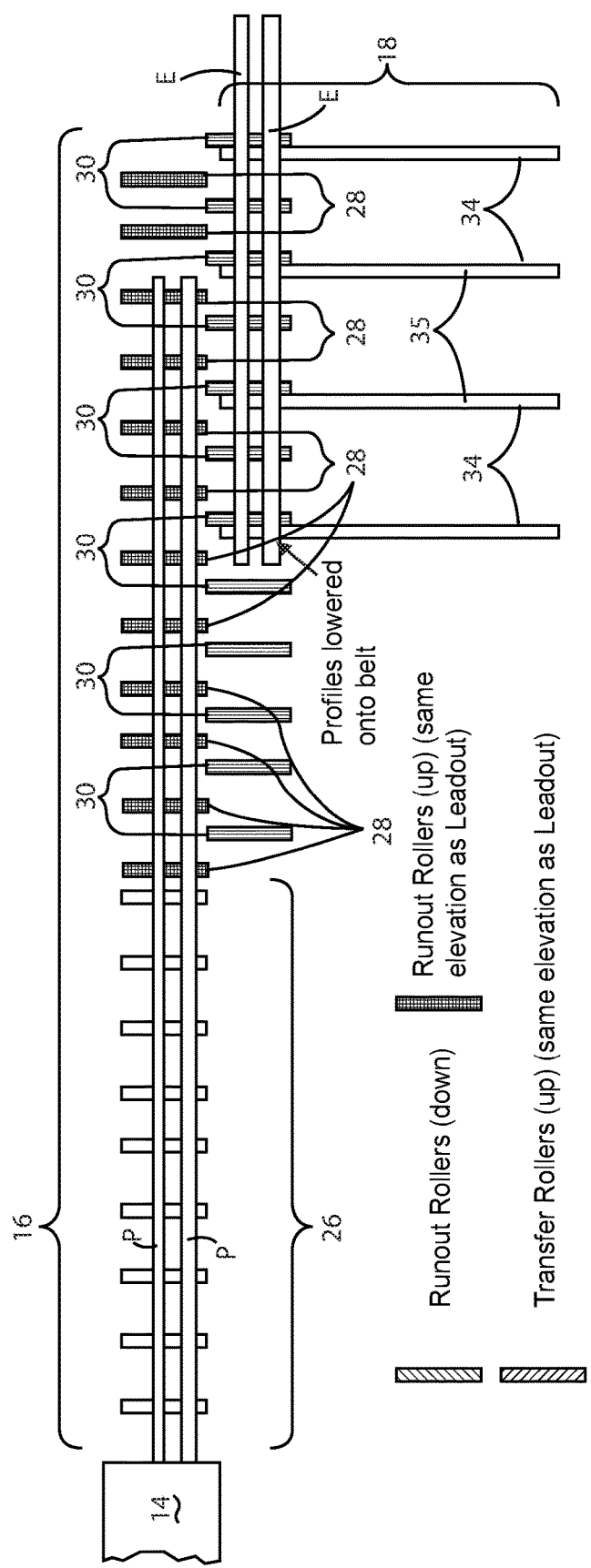
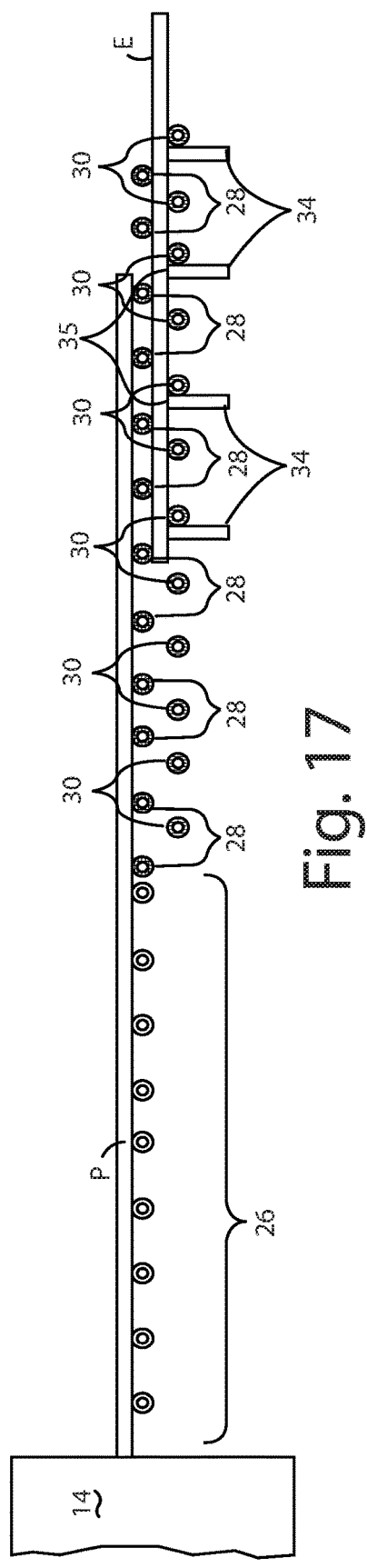
Fig. 16
Fig. 17

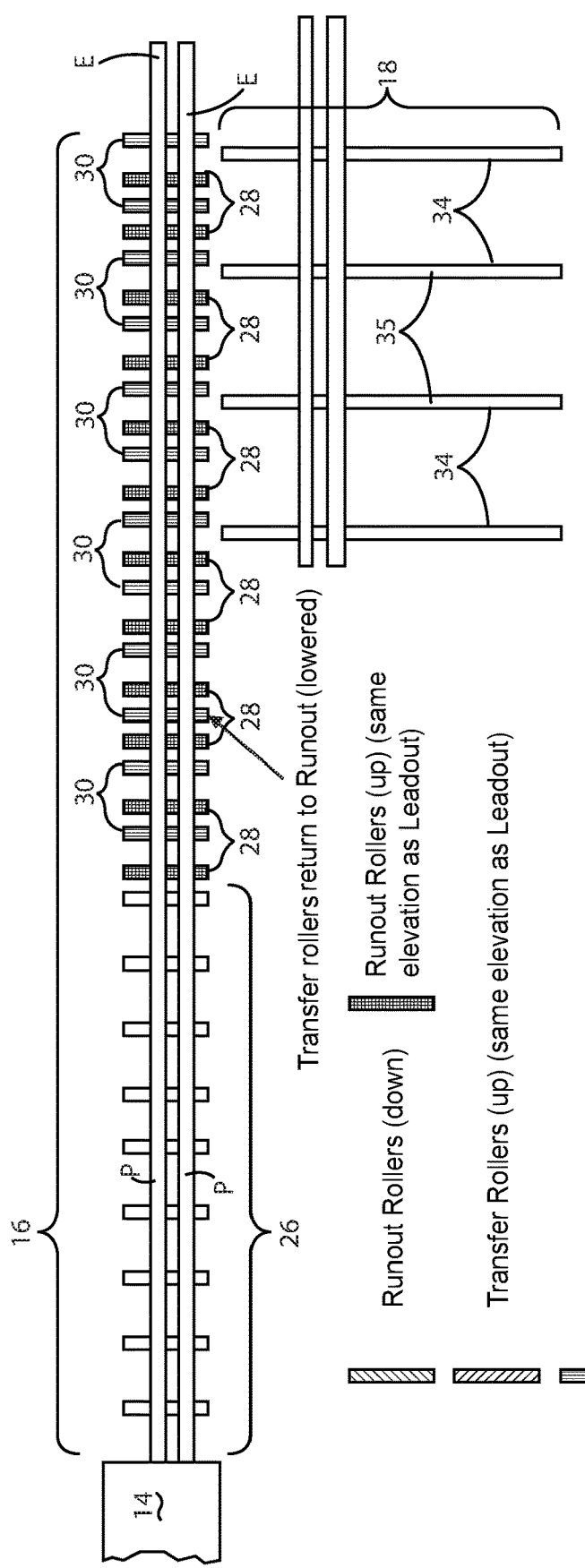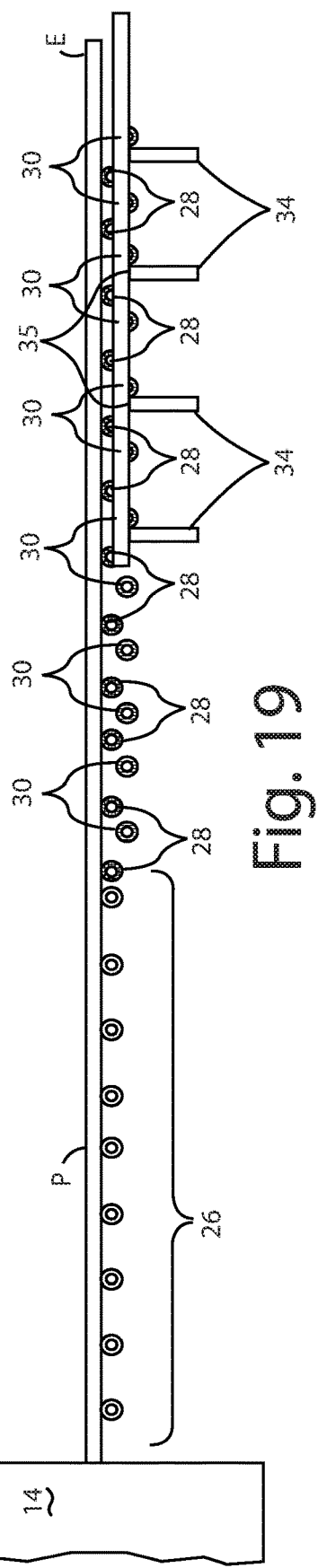
Fig. 18
Fig. 19

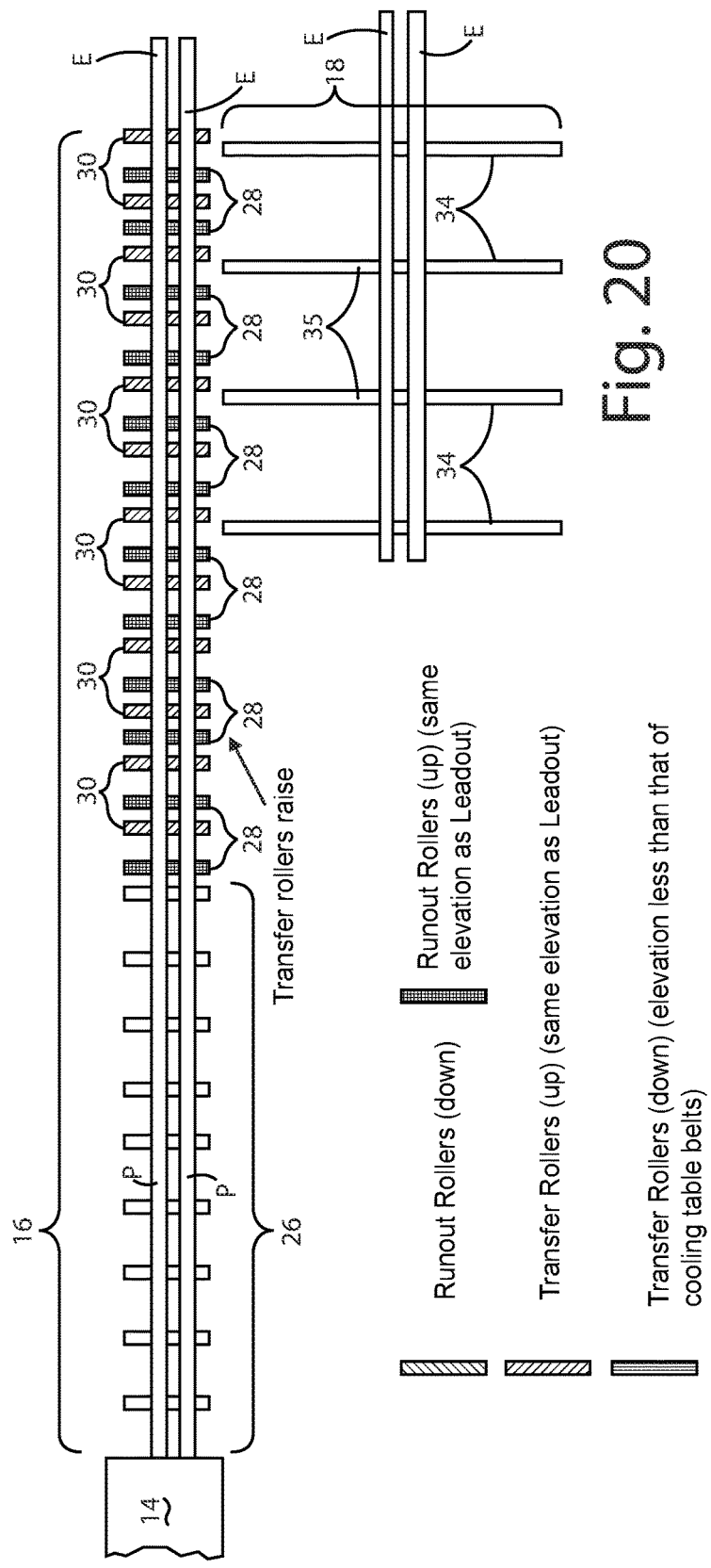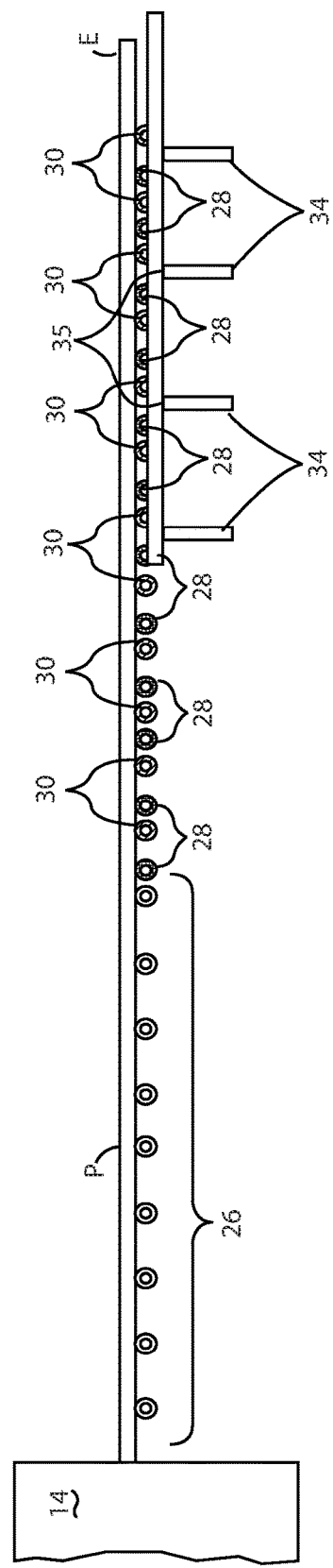

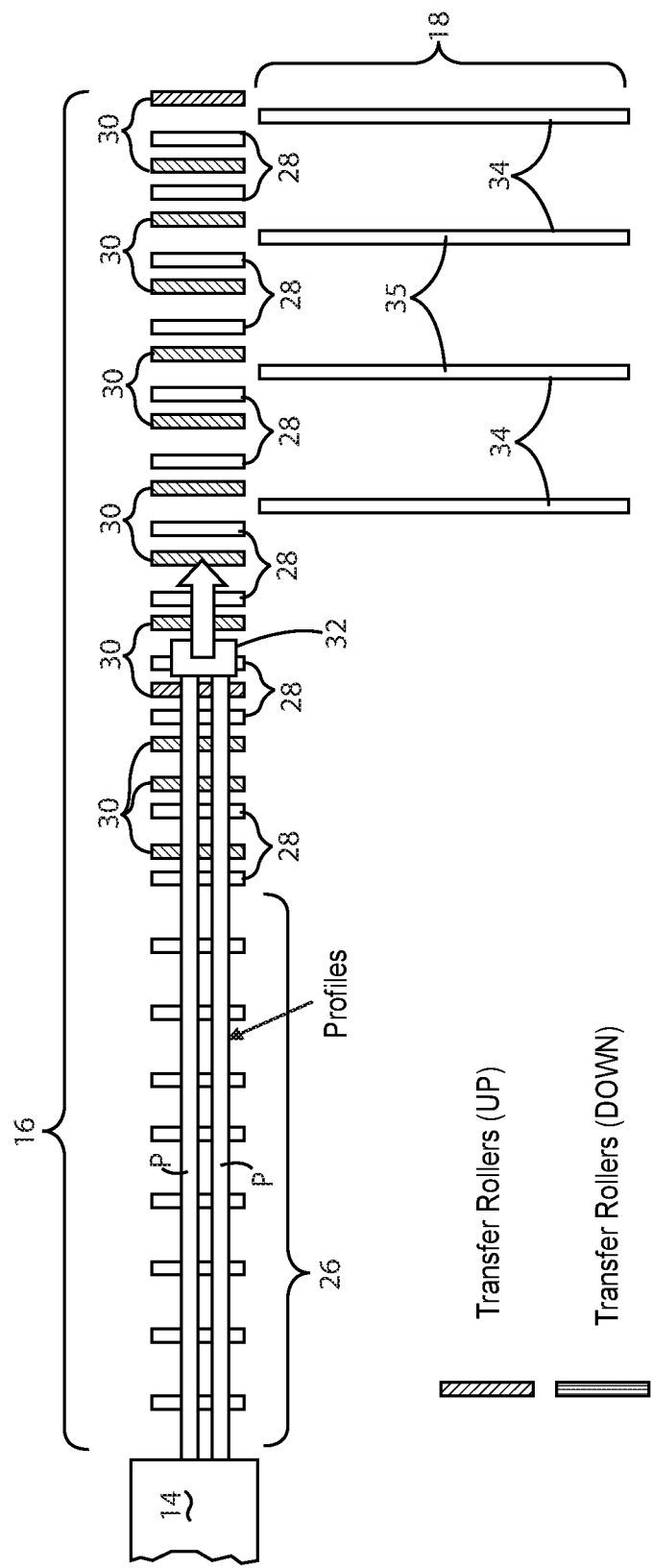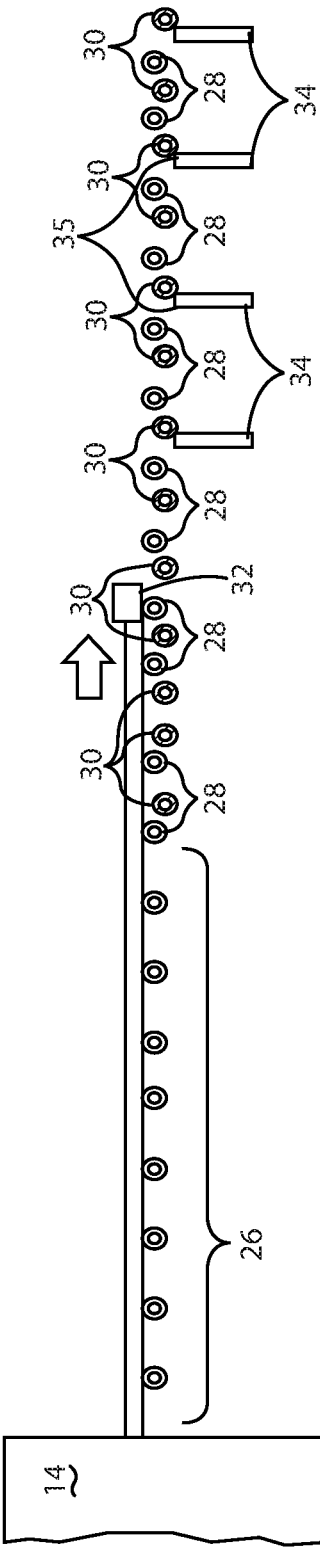

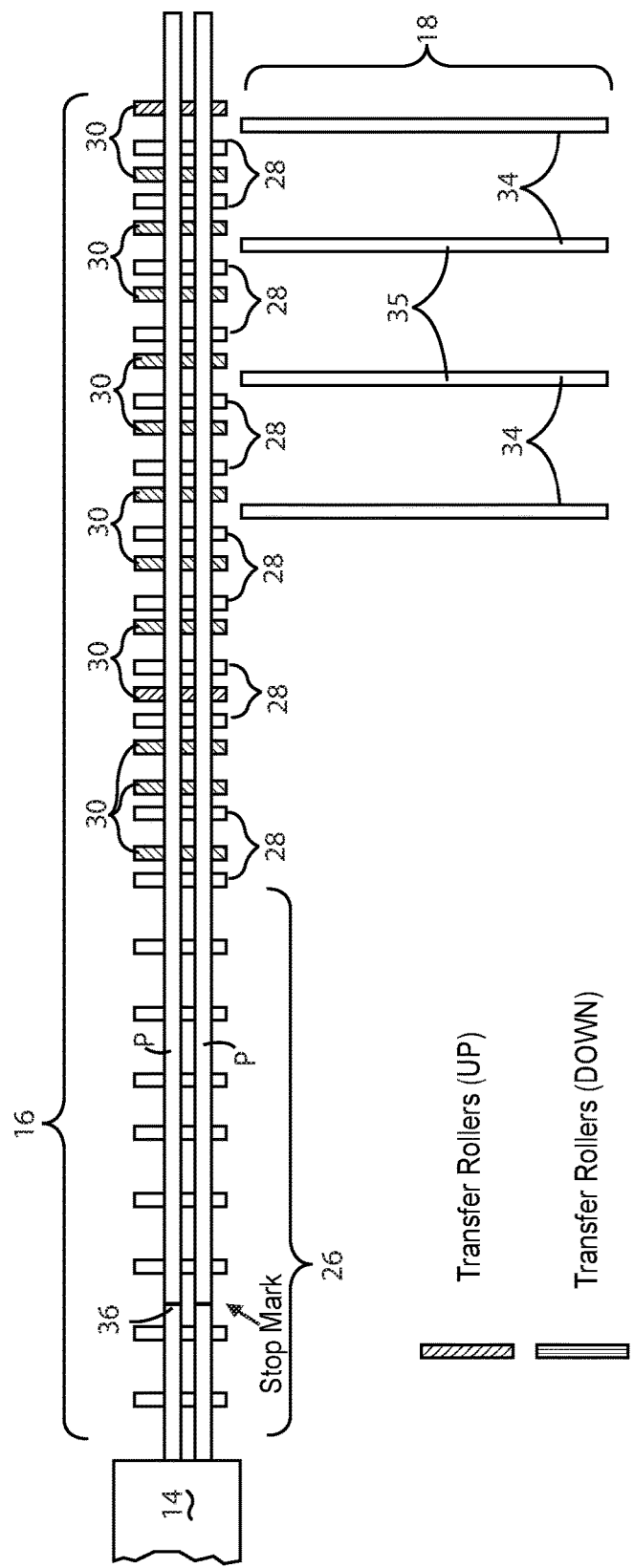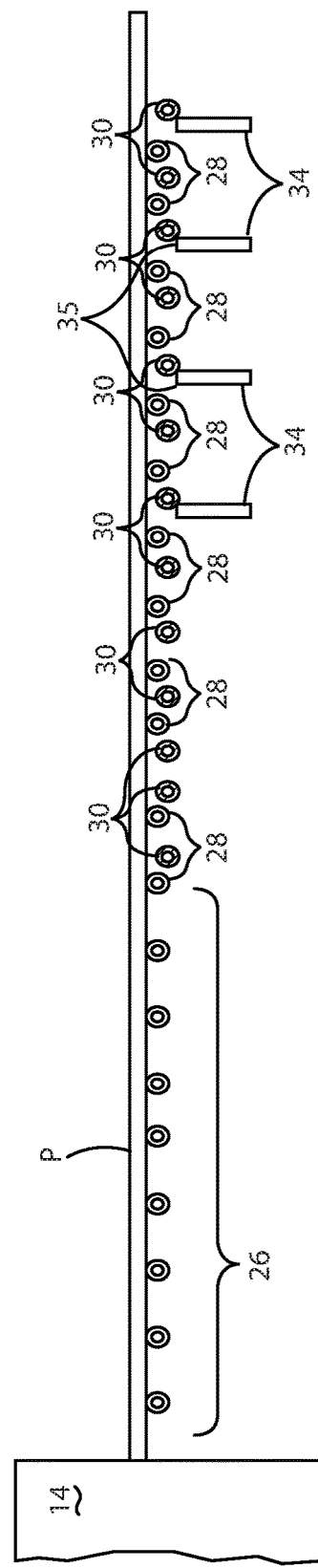

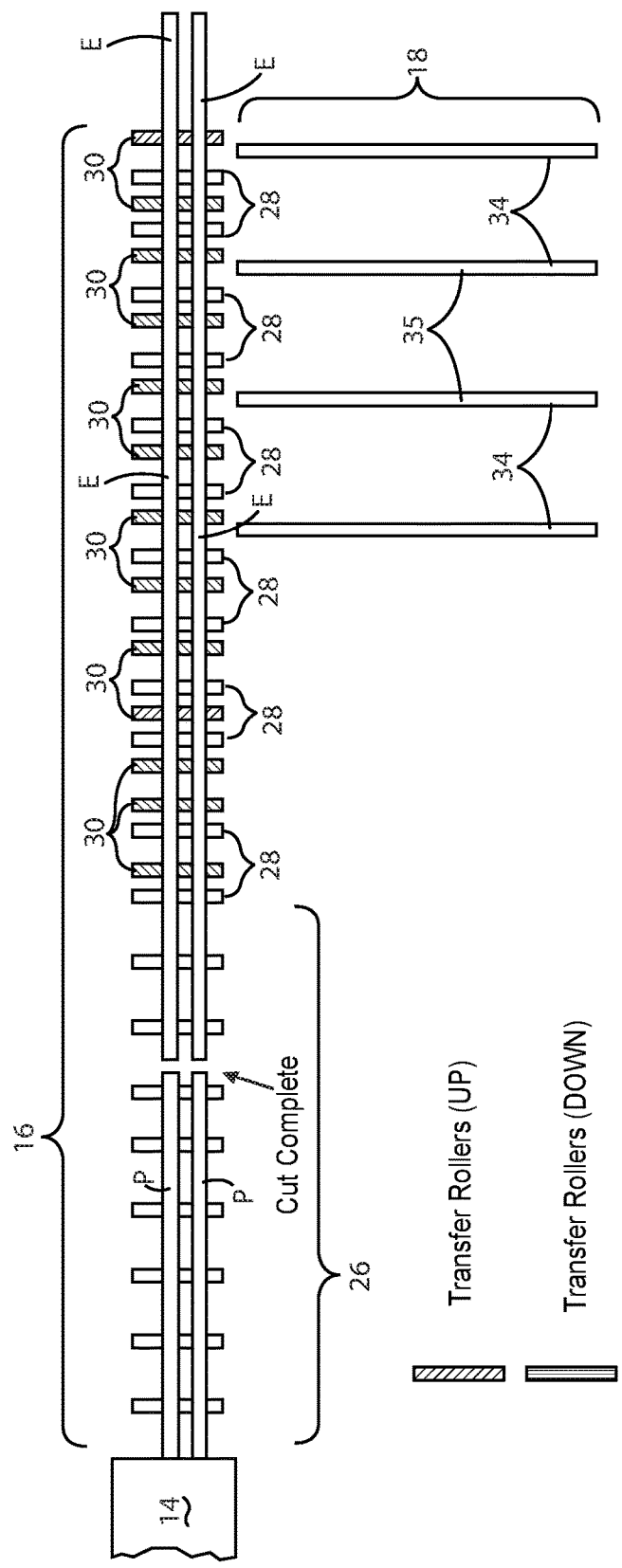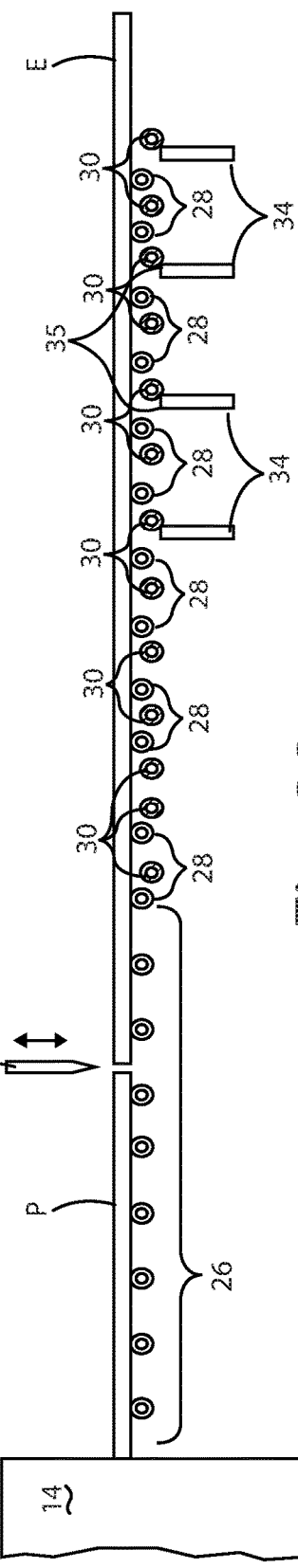

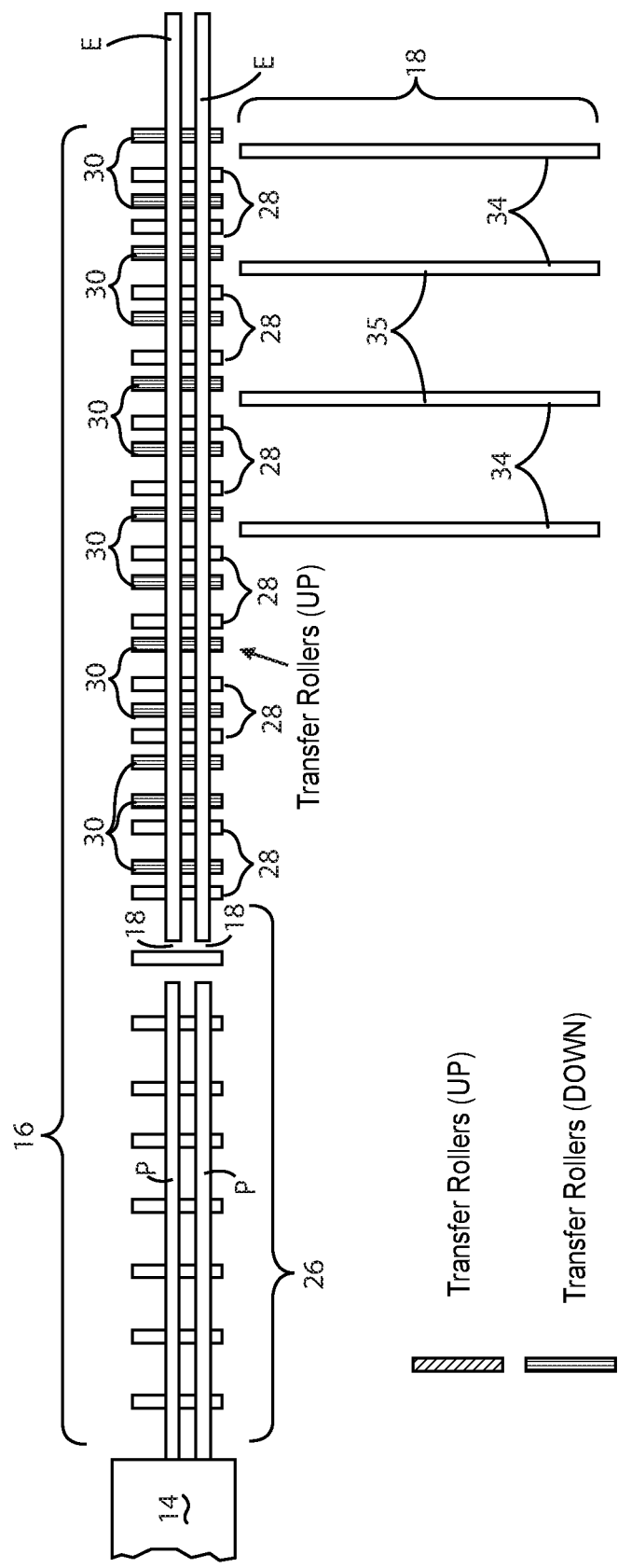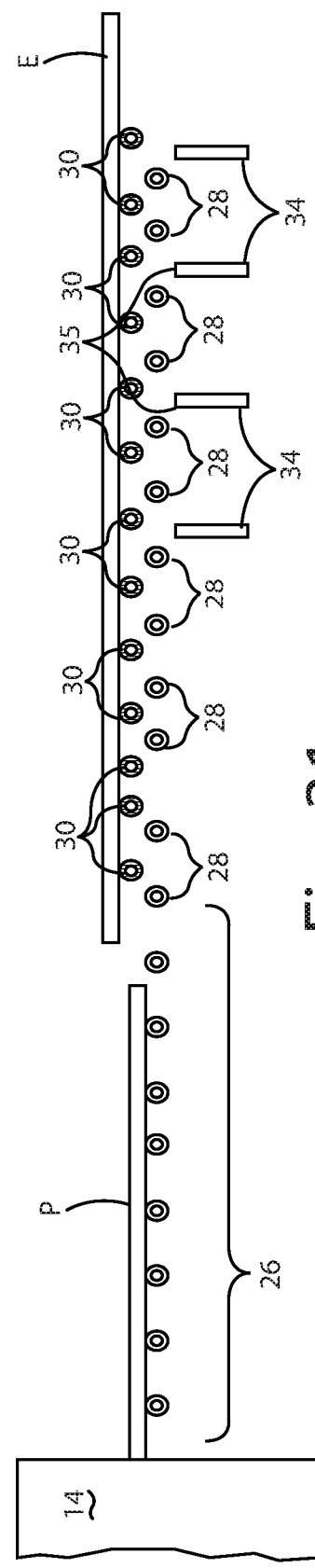

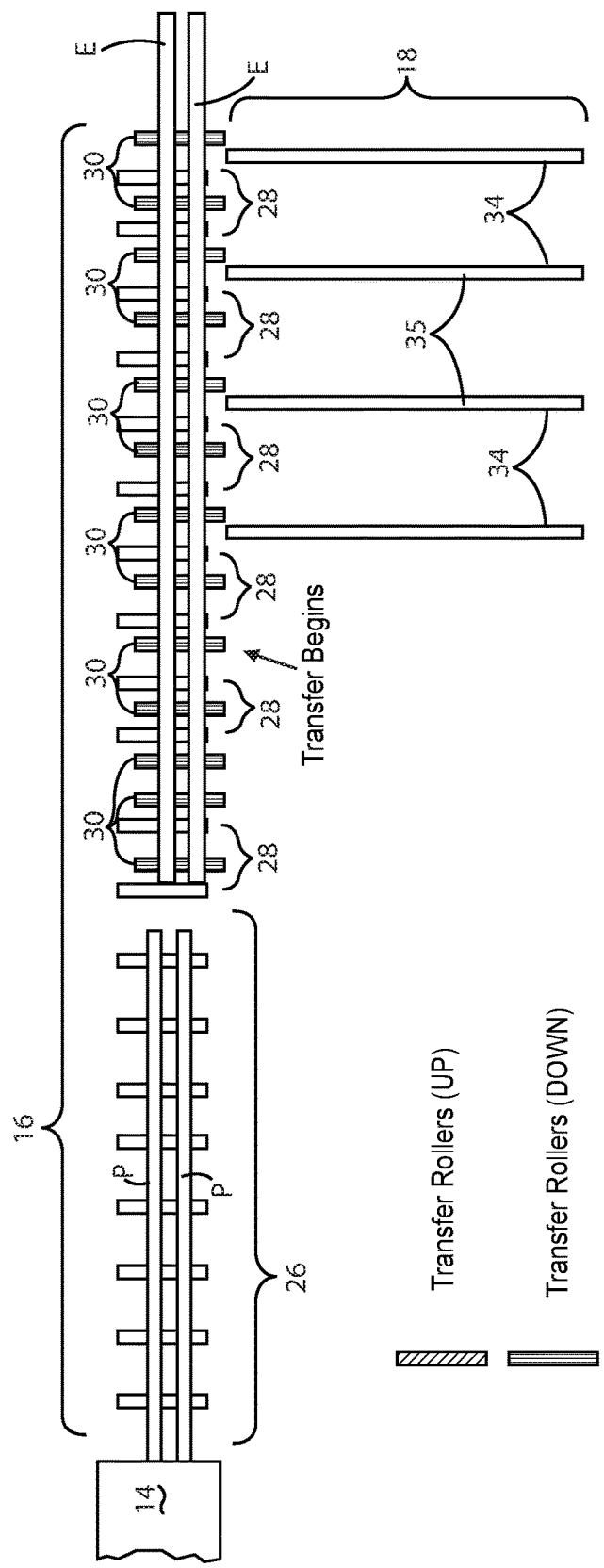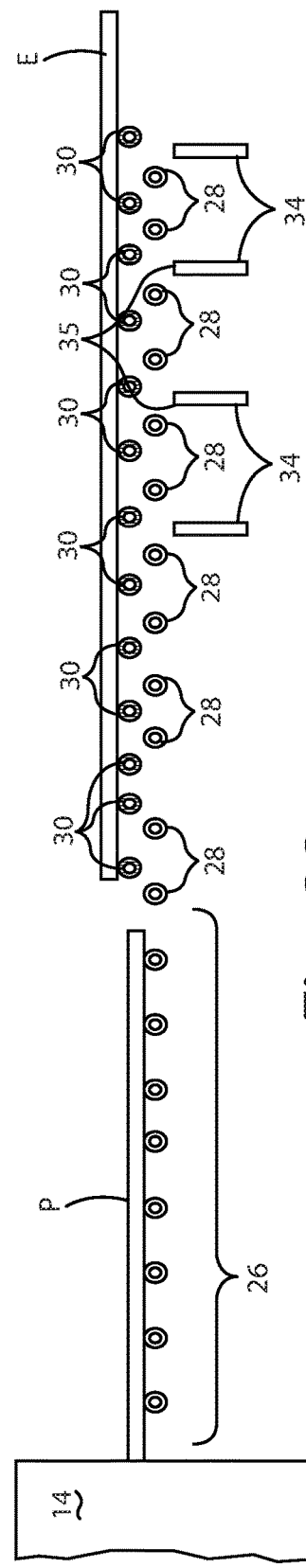

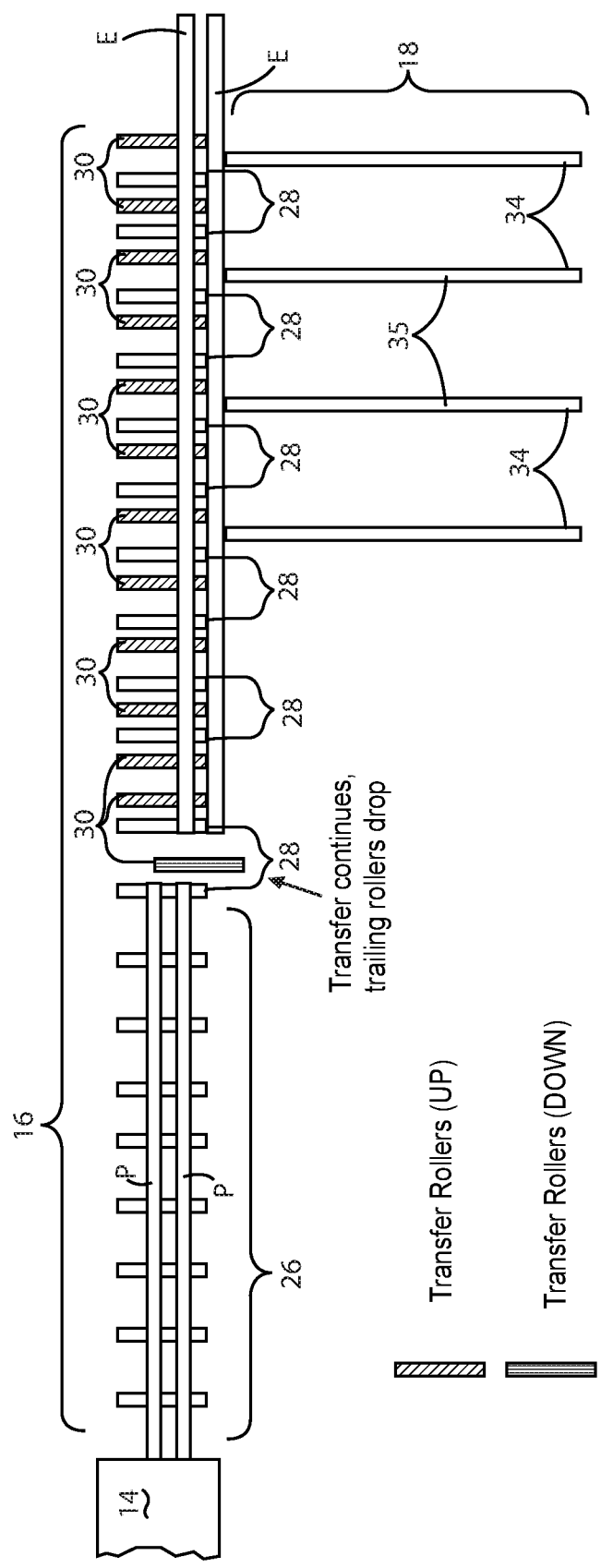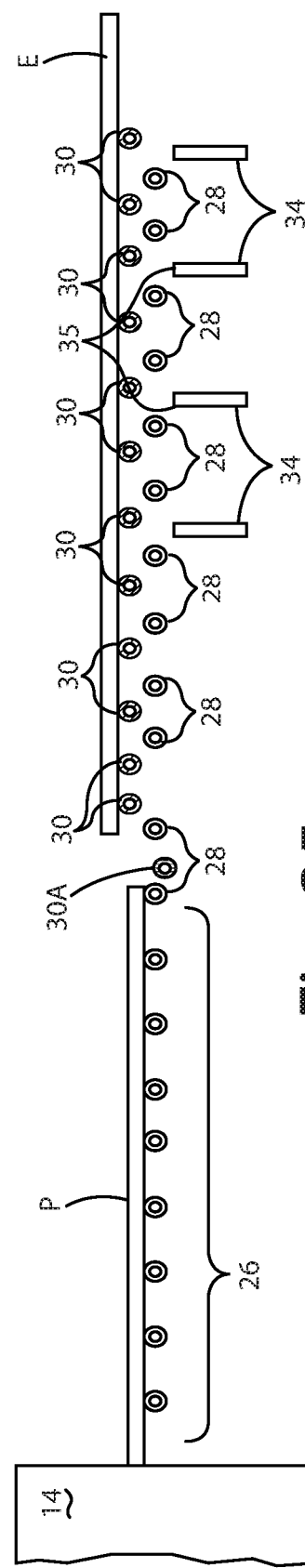

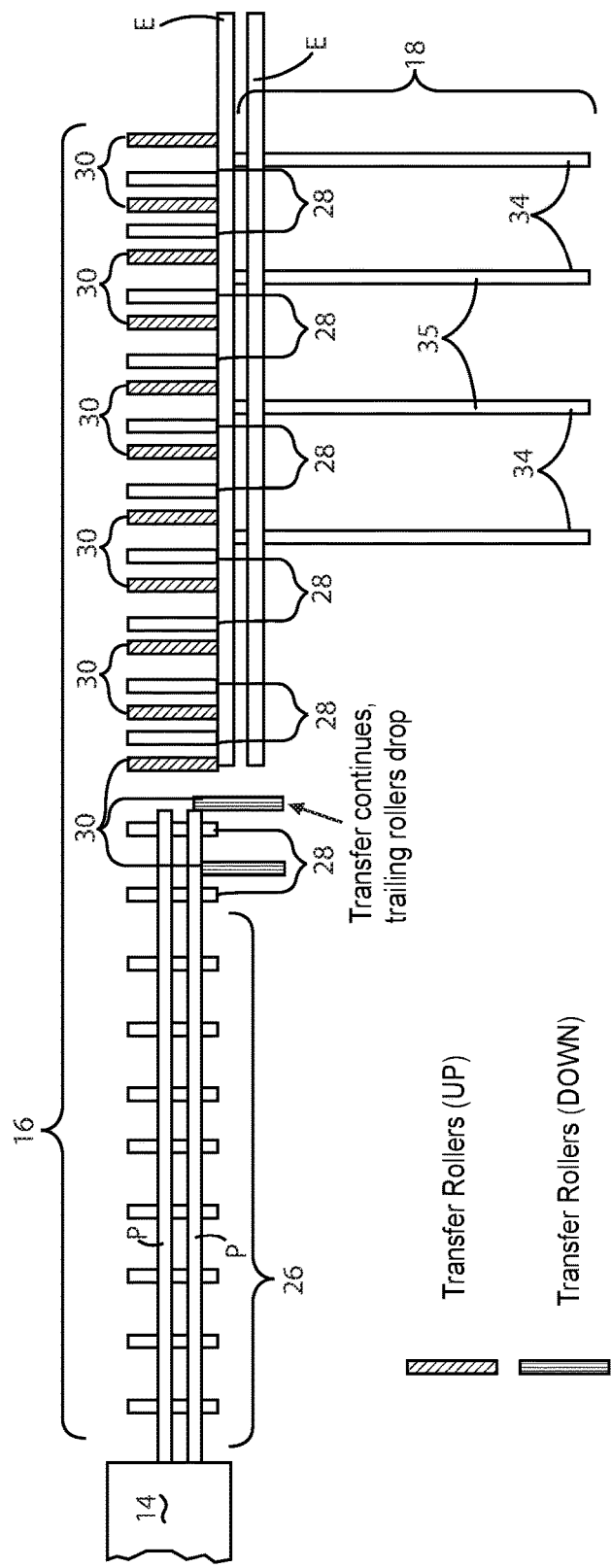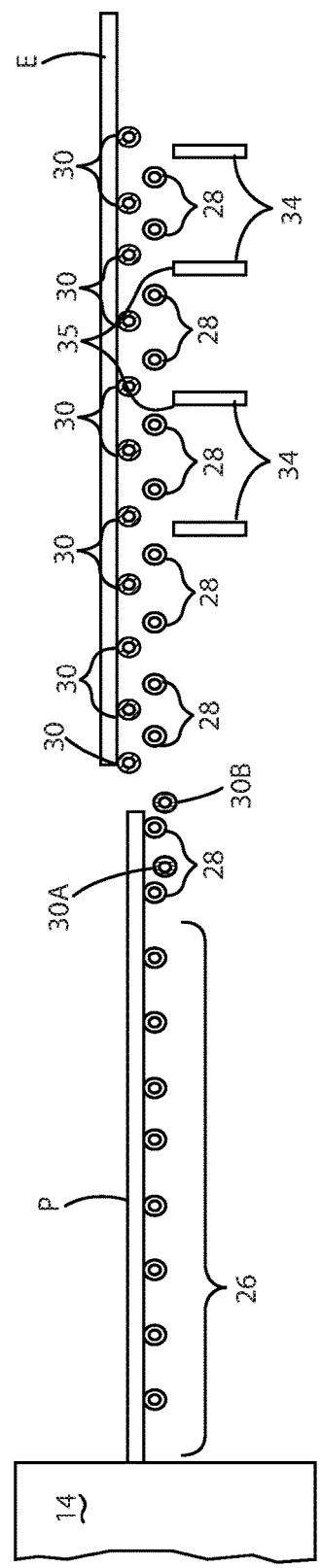

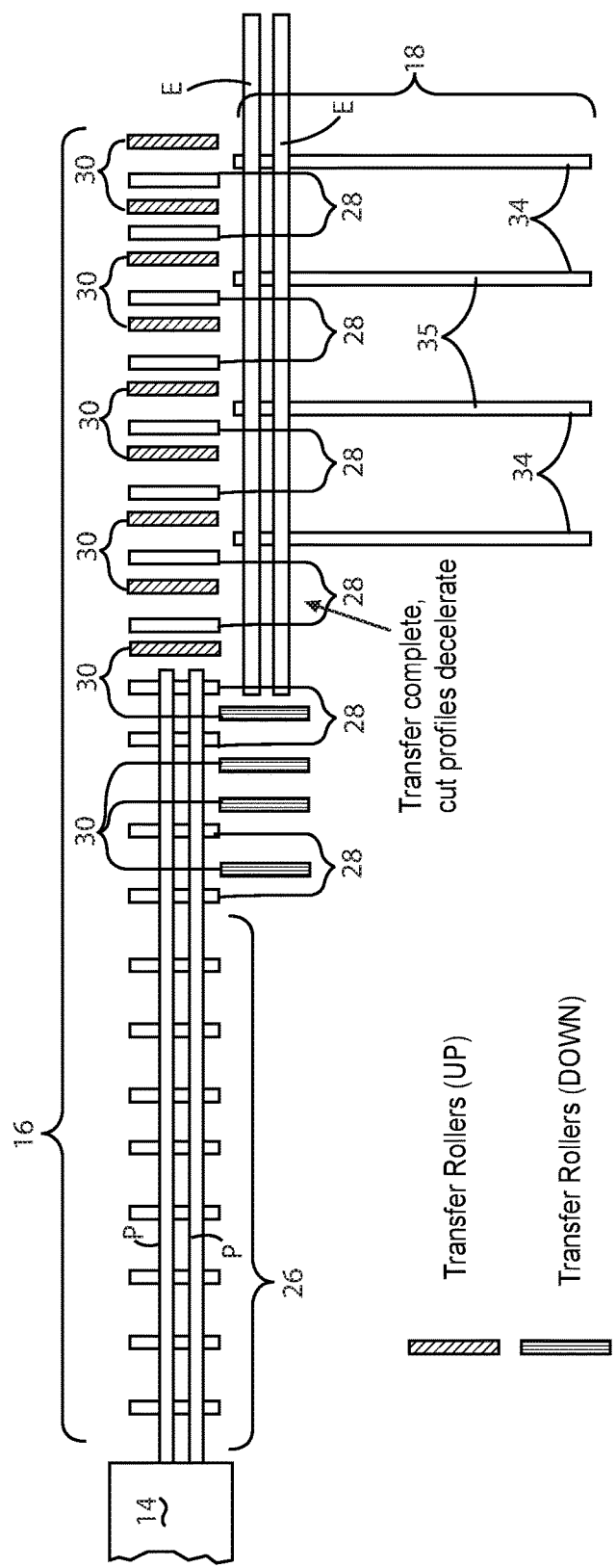
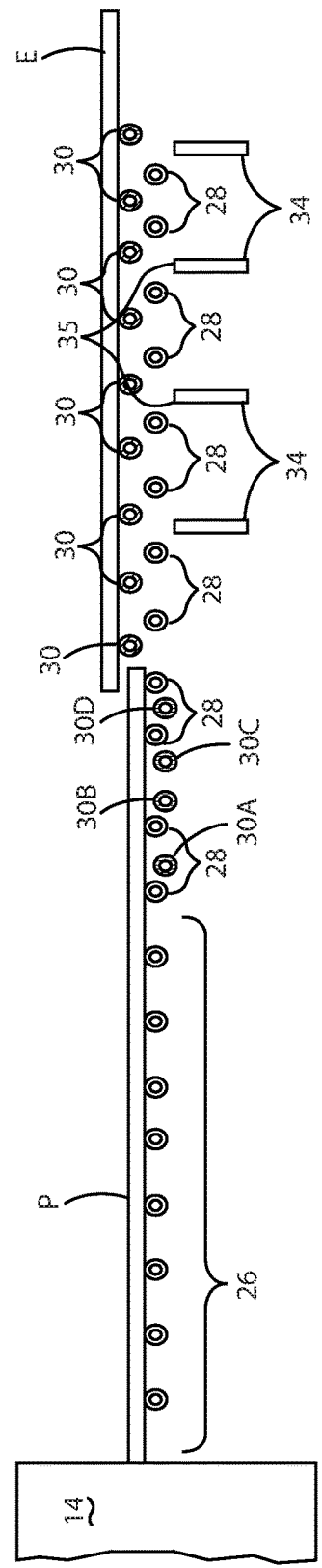

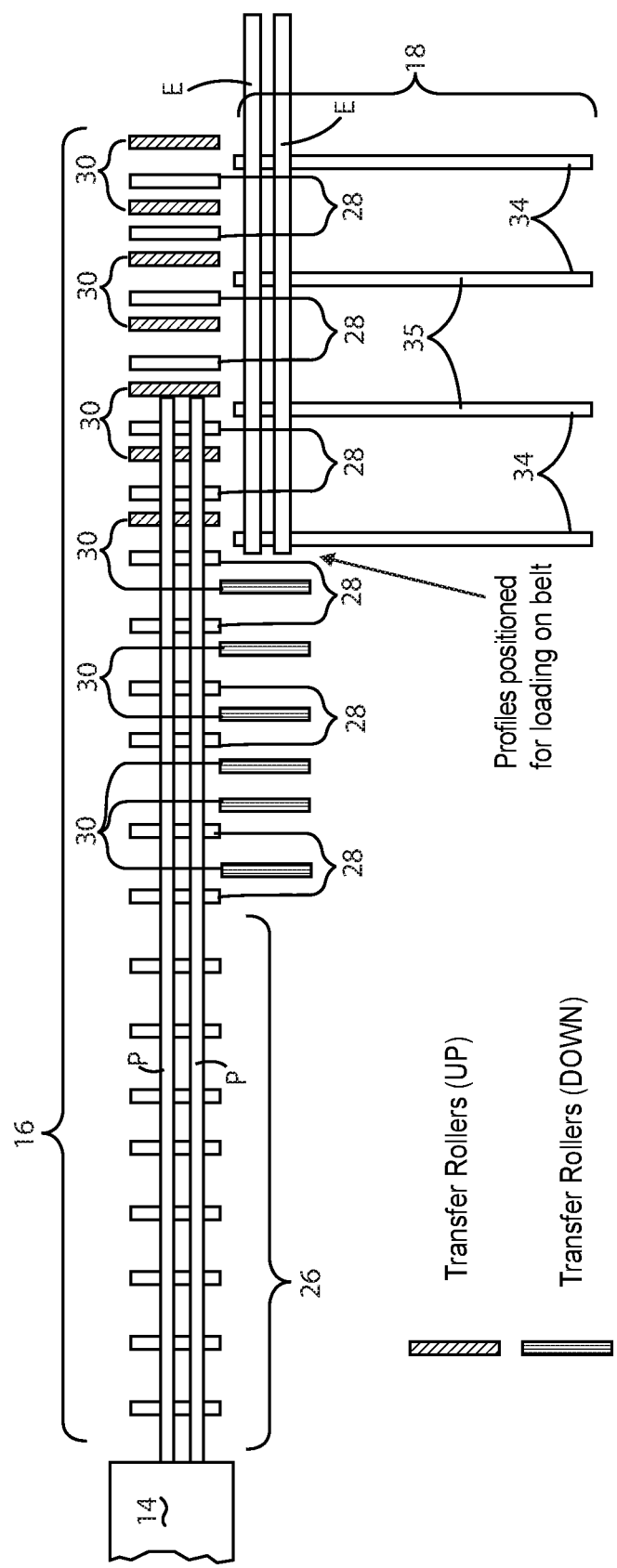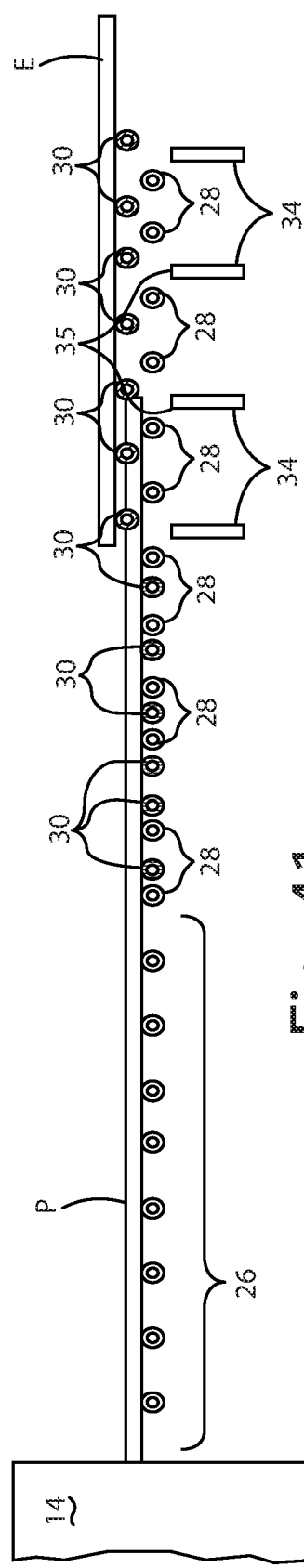

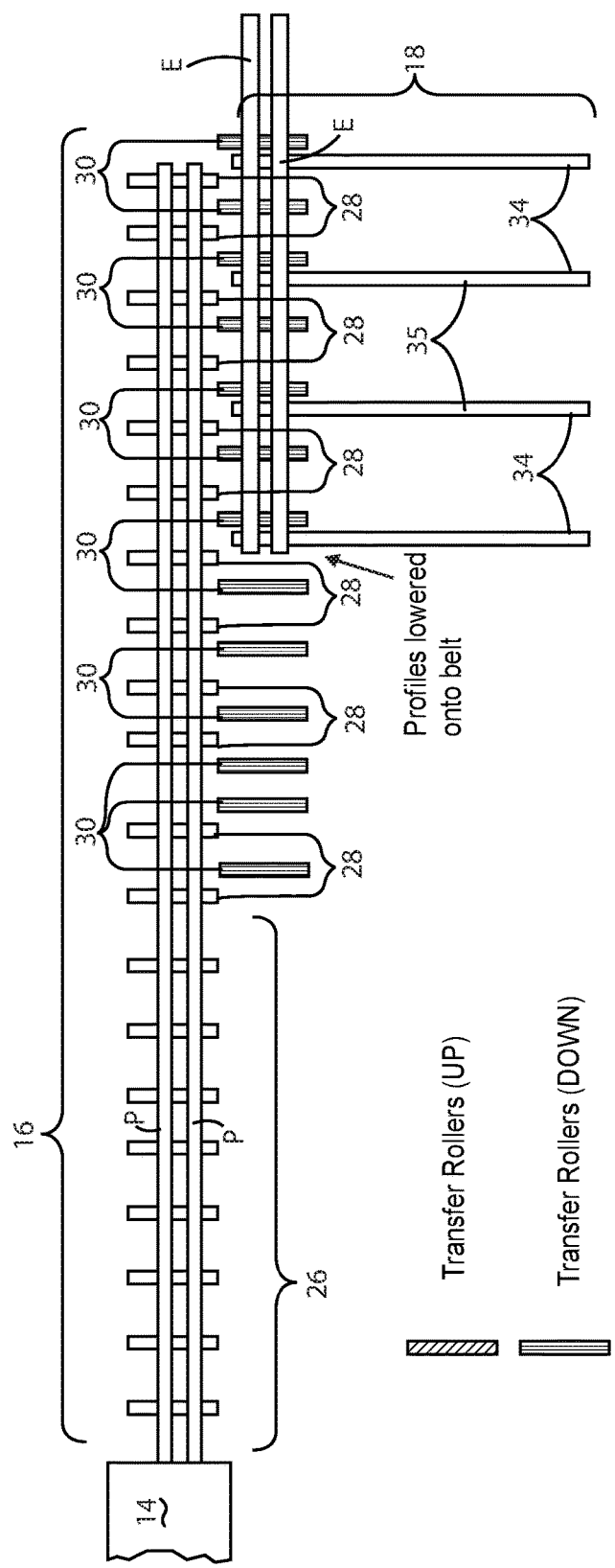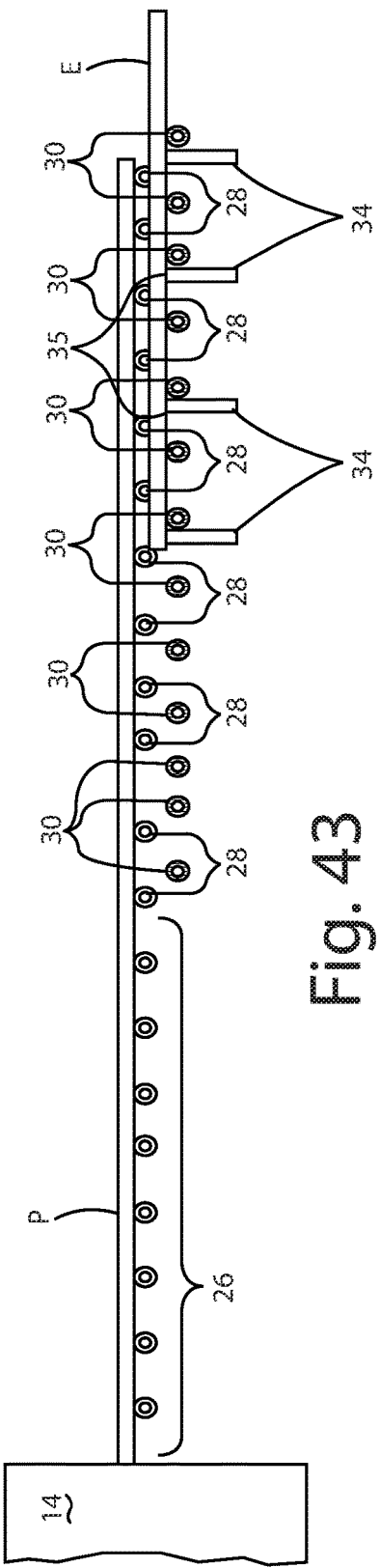

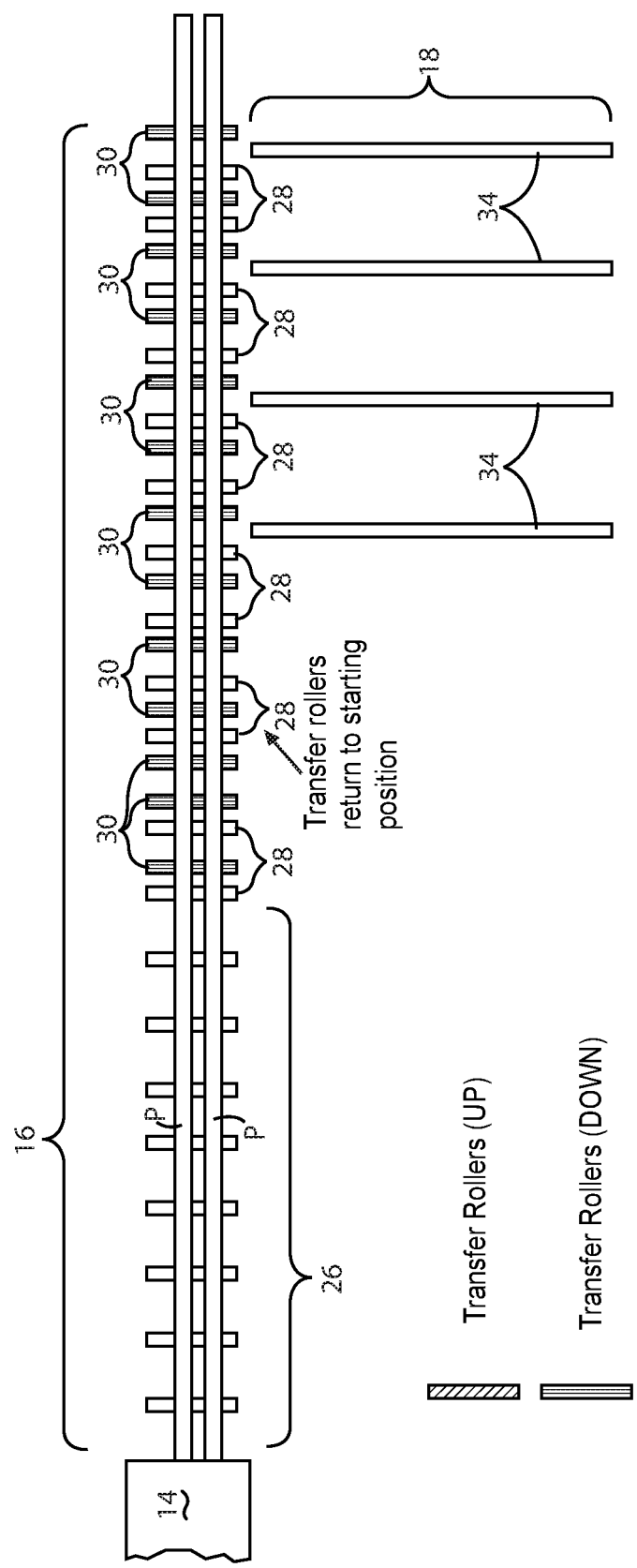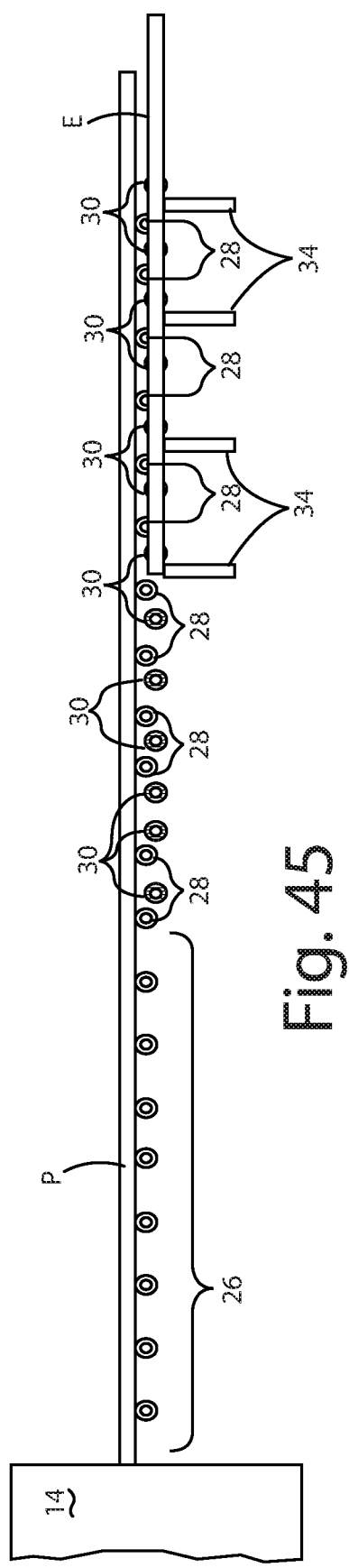

NONFERROUS EXTRUSION HANDLING SYSTEMS AND PROCESSES

BACKGROUND

The present invention relates to nonferrous extrusion systems and processes, and more particularly to such systems and processes for handling extrusions between a press and a cooling table.

Nonferrous extrusion systems and processes, such as those for extruding aluminum, are well known. A typical system 10 is illustrated in FIG. 1. The system 10 includes a furnace 12, a press 14, a runout table (and puller) 16, a cooling table 18, a stretcher 20, a batching table 22, and a saw 24. Billets of raw material are pre-heated in the furnace 12 and delivered to the press 14. The press 14 forces the softened material through an extrusion die to produce an elongated profile having a uniform cross-section throughout its length. Because the material exiting the press is not rigid, pullers are used to facilitate transporting the extrusions away from the press 14 and onto the runout table 16. The extrusions then are transferred to a cooling table 18, where the extrusions cool. The extrusions are then stretched by the stretcher 22, which exerts a longitudinal force on the extrusions. Due to the structural properties of the material, stretching straightens and reduces stress in the extrusions. The stretched extrusions are then accumulated on the batching table 22 into batches, which are forwarded to the saw 24 for cutting. The processed extrusions are then finished and/or stored for subsequent supply.

The transfer of extrusions from the runout table 16 to the cooling table 18 requires time—currently about four seconds in the most efficient current systems. Therefore, each extrusion on the runout table 16 must be accelerated by the puller to create a gap between each extrusion and the following extrusion. The created distance corresponds to (a) the distance that the extruded material travels at the velocity at which the extruded materials exits the press 14 (b) in the amount of time required to transfer extrusions from the runout table 16 to the cooling table 18. The created gap prevents a second extrusion from running into a first extrusion before the first extrusion can be transferred from the runout table 16 to the cooling table 18.

Unfortunately, the required created gap extends the required length of the system. This is especially problematic in "landlocked" systems—i.e. systems with physical limitations such as building size. Additionally, the time required to transfer extrusions from the runout table to the cooling table reduces the theoretical optimal output of a system.

SUMMARY

The present invention addresses the aforementioned problems by eliminating the need for a created gap between successive extrusions.

More specifically, the present invention is directed to a system and process providing improved transfer of extrusions from the runout table to the cooling table. The system includes a runout table having interleaved runout rollers and transfer rollers that are vertically shiftable with respect to one another. The transfer rollers additionally are horizontally or transversely shiftable between the runout table and the cooling table. The runout table receives extrusions in a longitudinal direction. The vertical and horizontal shifting of the rollers is controlled to transfer the extrusions from the runout table to the cooling table in a continuous fashion.

These and other advantages and features of the invention will be more fully understood and appreciated by reference to the description of the current embodiment and the drawings.

BRIEF DESCRIPTION OF THE DRAWINGS

FIGS. 2-23 are schematic illustrations of a first embodiment of the invention at various points in the operation of the first embodiment.

FIGS. 24-45 are schematic illustrations of a second embodiment of the invention at various points in the operation of the second embodiment.

DESCRIPTION OF THE CURRENT EMBODIMENTS

Figure 1:
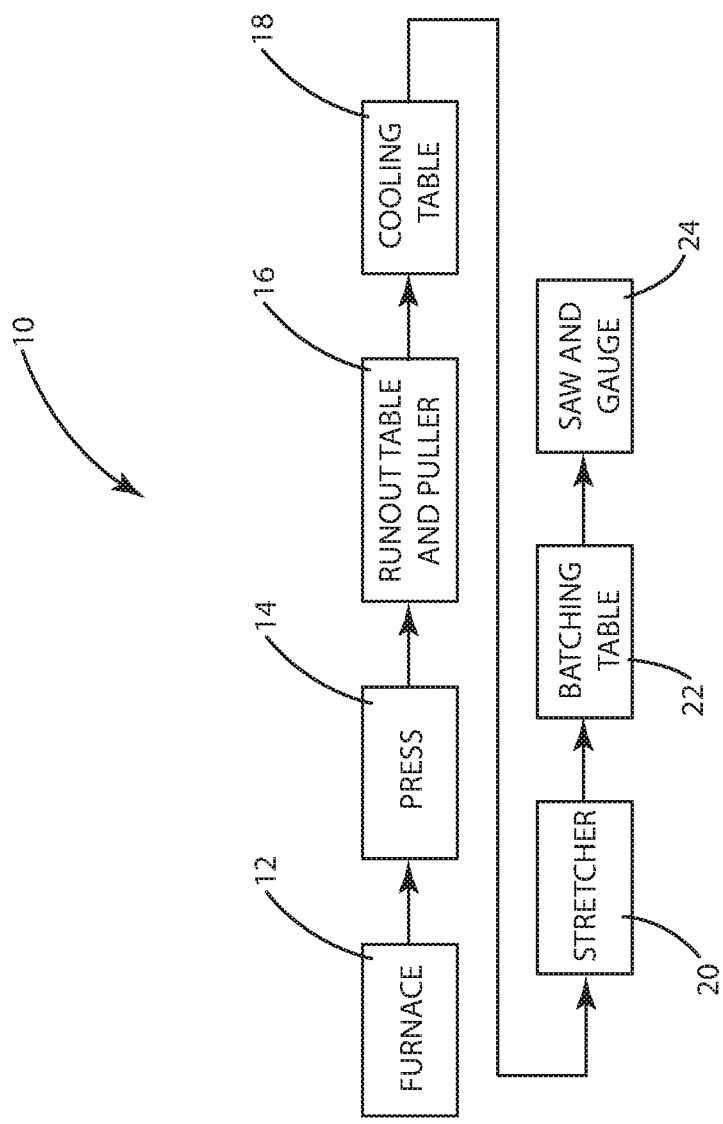
FIG. 1 is a schematic illustration of a nonferrous extrusion system.

Before the embodiments of the invention are explained, it is to be understood that the invention is not limited to the details of operation, the details of construction, or the arrangement of the components set forth in the following description or illustrated in the drawings. The invention may be implemented in various other embodiments and may be practiced or carried out in alternative ways not expressly disclosed herein.

In addition, it is to be understood that the phraseology and terminology used herein are for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one or more of X, Y or Z individually, and any combination of any one or more of X, Y and Z, for example, X, Y, Z; X, Y; X, Z; and Y, Z.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

I. First Embodiment

A. Construction

Portions of a nonferrous extrusion system in accordance with a first embodiment of the invention are illustrated in FIGS. 2-23. The illustrated portions include the press 14, the runout table 16, and the cooling table 18. The press 14 may be any conventional press known to those skilled in the art. The cooling table 18 may be any conventional cooling the table known to those skilled in the art. The runout table 16 of FIGS. 2-23 is novel to the present invention.

Turning initially to FIGS. 2-3, the runout table 16 includes a plurality of leadout rollers 26, a plurality of runout rollers 28, and a plurality of transfer rollers 30. The leadout rollers 26 are horizontally aligned at a common vertical height. The transfer rollers 30 also are horizontally aligned at the common vertical height. The runout rollers 28 are horizontally aligned but at a lower vertical height than the leadout rollers 26 and the transfer rollers 30. The leadout rollers 26 may preferably be stationary both vertically and horizontally. The runout rollers 28 are vertically shiftable as will be described. The transfer rollers 30 are shiftable both vertically and horizontally as will be described. The runout rollers 28 and the transfer rollers 30 are interleaved or alternating. Strict interleaving or alternating, although shown, is not required.

The runout table 16 additionally includes at least one puller head 32 of known construction for grasping extruded profiles and pulling them onto the runout table 16 along the rollers 26, 28, and 30.

The runout table 16 additionally includes support structure and drive structure (not shown) as necessary or desired for supporting and operating the rollers 26, 28, and 30 and the puller head 32.

The cooling table 18 includes a plurality of parallel cooling table belts 34, oriented transversely to the runout table 16. The belts 34 together define a surface (although discontinuous) for receiving and supporting extrusions. Although four belts 34 are illustrated, the cooling table 18 may include any number of belts as required or desired.

The cooling table 18 additionally includes support structure and drive structure as necessary or desired for supporting and operating the belts 34.

B. Operation

The operation of the first embodiment is illustrated in FIGS. 2-23. Each pair of even-numbered and odd-numbered figures (i.e. FIGS. 2-3, FIGS. 4-5, FIGS. 6-7, etc.) are top plan and side elevation views of the components in one of the sequential positions during a cycle of operation of the first embodiment.

FIGS. 2-3 show the components at the beginning of a cycle. Profiles P are extruded by the press 14. The free ends of the profiles P are grasped by the puller head 32, which assists in drawing the profiles across the runout table 16. As noted above the leadout rollers 26 and the transfer rollers 30 are at a common vertical height horizontally aligned with one another. The top surfaces 35 of the belts 34 are located below the upper surfaces of the rollers 26 and 30.

FIGS. 4-5 show the components in a subsequent position. The puller head (not visible) has traveled to the right (with respect to FIG. 4), and the profile P has traveled to the point where the stop mark 36 has exited the press 14. The stop mark 36 is the location at which the profiles P will be cut. As seen in FIG. 5, the rollers 26 and 30 remain horizontally aligned at the same vertical height.

FIGS. 6-7 show the components in a subsequent position. The profiles P have been cut at the stop mark 36 by a saw S associated with the puller head 32 as the profiles continue down the runout table 16. Cutting the profiles creates extrusions E that are separate from the profiles. As seen in FIG. 7, the rollers 26 and 30 remain horizontally aligned at the same vertical height.

FIGS. 8-9 show the components in a subsequent position. The puller head 32 (not visible) has accelerated slightly to create a small gap 38 between each extrusion E and its respective profile P. As seen in FIG. 9, the runout rollers 28 remain in their lower position below the transfer rollers 30. Consequently, the runout rollers 28 do not support the extrusions E, and the extrusions are supported solely by the transfer rollers 30.

FIGS. 10-11 show the components in a subsequent position. The transfer rollers 30 have started their horizontal or transverse or lateral shifting toward the cooling table 18. The extrusions E are transported with the transfer rollers 30. The evacuating puller head 32 shifts horizontally/transversely/laterally in unison with the shifting transfer rollers 30, so that the puller head pulls the extrusions in their linear direction.

FIGS. 12-13 show the components in a subsequent position. The transfer rollers 30 have transversely shifted completely so that the extrusions E are positioned over the cooling belts 34. The evacuating puller head 32 has shifted in unison with the transfer rollers 30. The runout rollers 28 have been raised to their upper position horizontally aligned with the leadout rollers 26. Consequently, the runout rollers 28 are at a vertical height to receive the continuing profiles P. Although the runout rollers 28 and the transfer rollers 30 are at the same vertical height, they are laterally or transversely offset from one another. Consequently, the continuing profiles P can move past the extrusions E. The transfer rollers 30 dwell in position, so that the extrusions E dwell over the cooling belts 34 for cooling.

FIGS. 14-15 show the components in a subsequent position. The transfer rollers 30 have moved downwardly toward the cooling belts 34. The profiles P have continued their movement past the extrusions E.

FIGS. 16-17 show the components in a subsequent position. The transfer rollers 30 have fully lowered to deposit the extrusions E on the belts 34 of the cooling table 18. The profiles P, while still in the grasp of the puller head 32, continue their travel past the extrusions E.

FIGS. 18-19 show the components in a subsequent position. The transfer rollers 30 have horizontally shifted toward the runout table 16. The extrusions E remain on the cooling table belts 34. The profiles P continue their movement past the extrusions E.

FIGS. 20-21 show the components in a subsequent position. The transfer rollers 30 have risen to be in horizontal alignment at the same vertical height with the leadout rollers 26 and the runout rollers 28. Consequently, the profiles P are supported by all of the rollers 26, 28, and 30.

Figure 22:
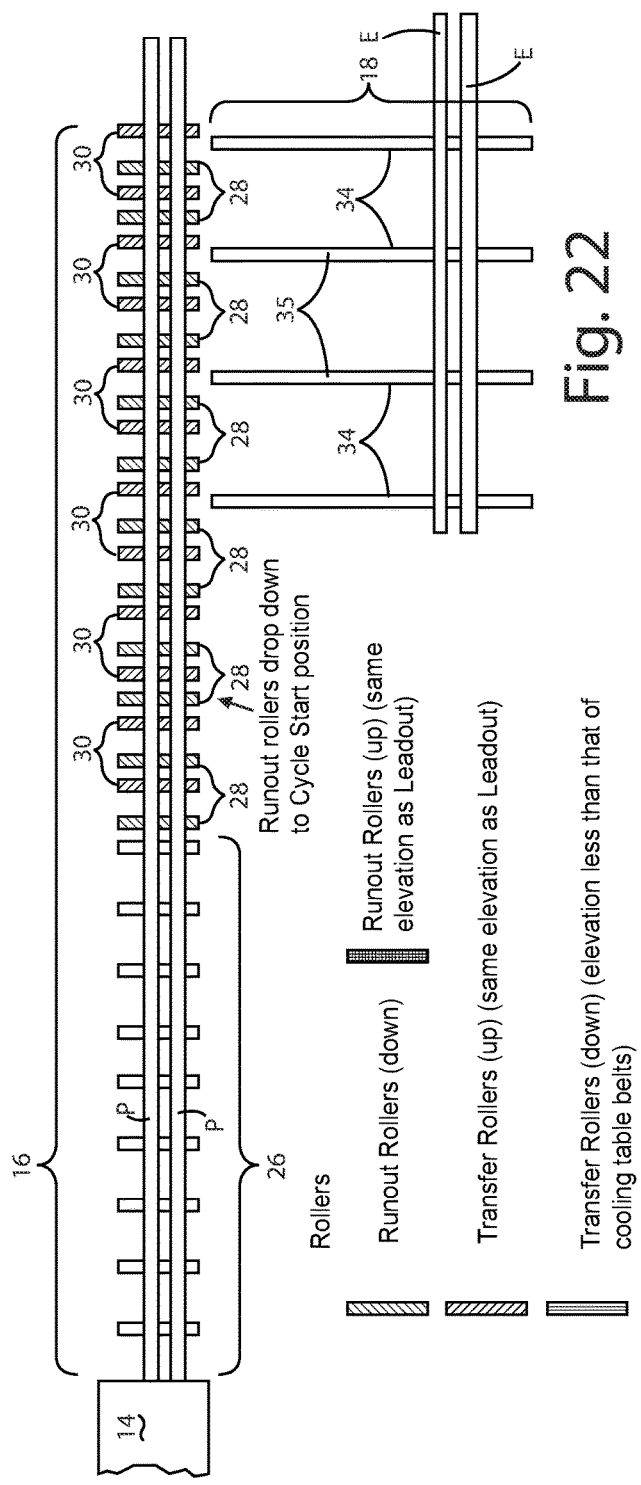
Figure 23:
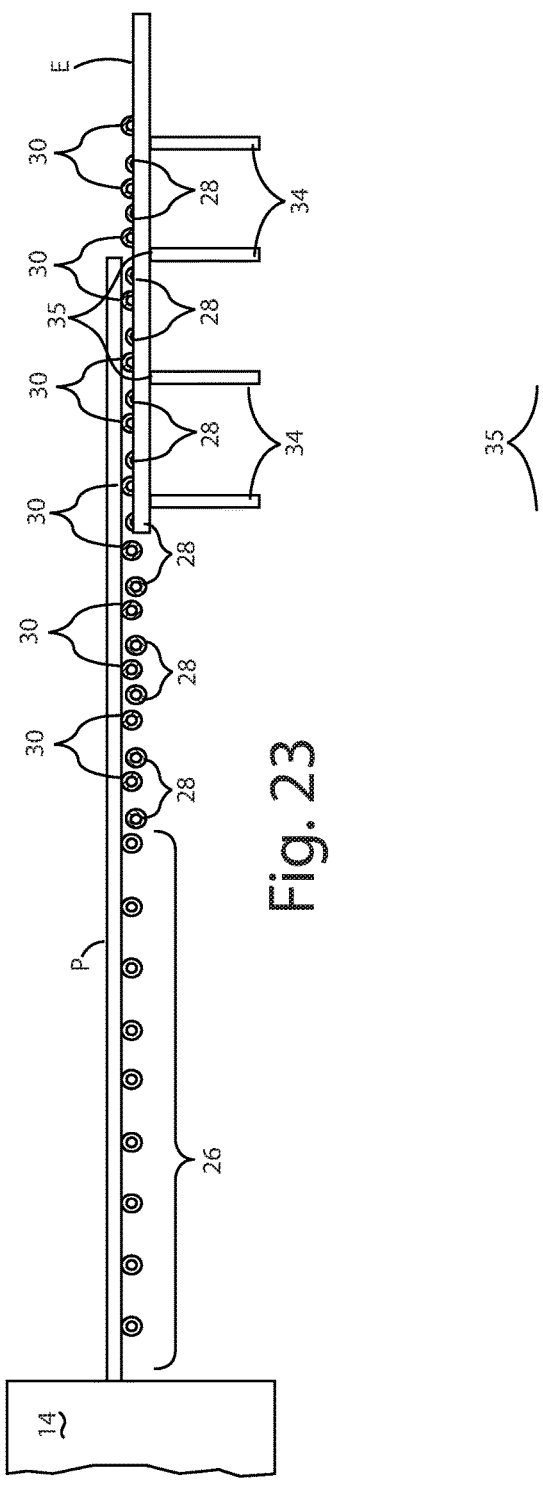

FIGS. 22-23 show the components in a subsequent position. The runout rollers 28 are lowered below the leadout rollers. Consequently, the profiles P are supported by the transfer rollers 30. The operational cycle then returns to the configuration shown in FIGS. 8-9.

II. Second Embodiment

An alternative embodiment of the invention is illustrated in FIGS. 24-45.

A. Construction

The components in the second embodiment are identical to the corresponding components in the first embodiment. These components include the runout table 16, the cooling table 18, the leadout rollers 26, the runout rollers 28, the transfer rollers 30, the puller head 32, and the cooling belts 34. However, the runout rollers 28 in the second embodiment may remain at a fixed vertical height horizontally aligned with the leadout rollers 26. Further, the components of the second embodiment are operated differently to achieve the same result of transferring extrusions E from the runout table 16 to the cooling table 18.

B. Operation

The operation of the second embodiment is illustrated in FIGS. 24-45. Each pair of even-numbered and odd-numbered figures (i.e. FIGS. 24-25, FIGS. 26-27, FIGS. 28-29, etc.) are top plan and side elevation views of the components in one of the sequential positions during the operation of the second embodiment.

FIGS. 24-25 show the components at the beginning of an operational cycle. The leadout rollers 26 and the runout rollers 28 are horizontally aligned with one another at a common vertical height. The transfer rollers 30 are in their lower position below the leadout rollers 26 and the runout rollers 28. Consequently, the profiles P are supported by the rollers 26 and 28 as the puller head 32 draws the profiles across the runout table 16.

FIGS. 26-27 show the components in a subsequent position. The profiles P have advanced to the point where the stop mark 36 has exited the press 14. The puller head 32 (not visible) has moved to the right as viewed in FIG. 26. The rollers 26 and 28 remain horizontally aligned (as they do throughout operation of the second embodiment), and the transfer rollers 30 remain in their lower position.

FIGS. 28-29 show the components in a subsequent position. As the profiles P continue their movement along the transfer table 16, the saw S associated with the puller head 32 cuts the profiles P at the stop mark 36. These cuts separate extrusions E from the continuing profiles P. The rollers 26 and 28 remain horizontally aligned, and the transfer rollers 30 remain in their lower position.

FIGS. 30-31 show the components in a subsequent position. The transfer rollers 30 have been shifted upwardly to an upper position above the runout rollers 28. Consequently, the extrusions E are supported above the profiles P.

FIGS. 32-33 show the components in a subsequent position. The transfer rollers 30 have begun lateral or transverse movement toward the cooling table. Consequently, the extrusions E supported on the transfer rollers 30 also have begun moving laterally or transversely toward the cooling belts 34. The evacuating puller head 32 shifts horizontally/transversely/laterally in unison with the shifting transfer rollers 30, so that the puller head pulls the extrusions in their linear direction.

FIG. 34-35 show the components in a subsequent position. The first transfer roller 30a has been lowered from its elevated position in FIGS. 32-33 to its original lower position below the leadout rollers 26 and the runout rollers 28. The first transfer roller 30a is lowered after the extrusions E have passed the roller and before the profiles P reach the roller.

FIGS. 36-37 show the components in a subsequent position. The second transfer roller 30b has been lowered from its elevated position in FIGS. 34-35 to its original lower position in which it is below the leadout rollers 26 and the runout rollers 28. The second transfer roller 30b, like the first transfer roller 30a, is lowered after the extrusions E have passed the roller and before the profiles P reach the roller.

FIGS. 38-39 show the components in a subsequent position. The third and fourth transfer rollers 30c and 30d have been lowered sequentially from their elevated positions shown in FIGS. 36-37 to their original lower position in which they are below the leadout rollers 26 and the runout rollers 28. This sequential lowering of the individual transfer rollers 30 continues until the horizontally shifting transfer rollers 30 are no longer in the path of the advancing profiles P. In the disclosed embodiment, this is until four of the rollers (i.e. 30a, 30b, 30c, and 30d) have been lowered. As further illustrated in FIGS. 38-39, the transfer rollers 30 have fully transversely shifted so that the rollers 30 are not aligned with the runout rollers 28. When so positioned, the transfer rollers 30 support the extrusions E directly above the cooling table belts 34. The transfer rollers 30 dwell in this position, so that the extrusions E dwell over the cooling table belts 34 for cooling.

FIGS. 40-41 show the components in a subsequent position. The transfer rollers 30 have begun lowering from the elevated position toward the cooling table belts 34. The profiles P continue advancing beyond the extrusions E.

FIGS. 42-43 show the components in a subsequent position. The transfer rollers 30 have all been lowered to their lowermost position so that the extrusions E are deposited on the cooling table belts 34. All of the transfer rollers 30 are horizontally aligned with one another in the lowered position.

FIGS. 44-45 show the components in a subsequent position. The transfer rollers 30 have laterally shifted back into alignment with the runout rollers 28. The transfer rollers remain below the leadout rollers 26 and the runout rollers 28. This completes the cycle of transferring a set of extrusions E from the runout table 16 to the cooling table 18. The cycle then returns to the position illustrated in FIGS. 24-25.

It should be noted that, in both embodiments, the puller head 32 and the associated puller move transversely as well as linearly as the transfer rollers 30 move transversely, so that the puller head moves in unison with the extrusions E. Consequently, the puller head always exerts a force linearly aligned with the extrusions E.

The systems and processes of both embodiments of the present invention enable faster extrusion speeds, which are at least in part a function of the leadout length (i.e. the distance between the press and the puller). Often this distance is limited by physical limitations such as the plant size or configuration. By eliminating the need to pull a significant gap between successive extrusions, the present systems and processes make more efficient use of the physical limitations. The present invention therefore enables longer extrusions to be polled within a given physical configuration. The present invention also enables the use of more compact configurations.

III. Conclusion

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents.

This disclosure is illustrative and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as alternatives.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A nonferrous extrusion method comprising the steps of:
   receiving an extrusion in a longitudinal direction on a runout table, the runout table including runout rollers and transfer rollers in a first position so that at least one of the runout rollers and the transfer rollers supports the extrusion;
   vertically shifting the runout rollers and/or the transfer rollers with respect to one another to a second position so that the extrusion is supported only by the transfer rollers;
   laterally shifting the transfer rollers in a first direction to a third position in which the extrusion is supported above a cooling table;
   vertically shifting the transfer rollers to a fourth position so that the extrusion is deposited on the cooling table; and
   laterally shifting the transfer rollers in a second direction opposite to the first direction to return the transfer rollers to the first position.

2. A nonferrous extrusion handling method as defined in claim 1 wherein:
   the cooling table includes belts; and
   the second vertically shifting step results in the extrusion being supported on the belts.

3. A nonferrous extrusion handling method as defined in claim 1 wherein the receiving step includes pulling the extrusion.

4. A nonferrous extrusion handling method as defined in claim 1 further comprising, before the receiving step, receiving the extrusion on a leadout table, the leadout table including leadout rollers horizontally aligned with at least one of the runout rollers and the transfer rollers.

5. A nonferrous extrusion handling method as defined in claim 1 wherein the first vertically shifting step includes lowering the runout rollers.

6. A nonferrous extrusion handling method as defined in claim 5 wherein the second vertically shifting step includes lowering the transfer rollers.

7. A nonferrous extrusion handling method as defined in claim 6 further comprising, after the first laterally shifting step, raising the runout rollers to be horizontally aligned with the leadout rollers.

8. A nonferrous extrusion handling method as defined in claim 1 wherein the first vertically shifting step includes raising the transfer rollers.

9. A nonferrous extrusion handling method as defined in claim 8 wherein the second vertically shifting step includes lowering the transfer rollers.

10. A nonferrous extrusion handling method as defined in claim 9 wherein the first vertically shifting step further includes lowering each transfer roller after the roller no longer supports the extrusion.

11. A nonferrous extrusion handling system comprising:
    a runout table including runout rollers and transfer rollers vertically shiftable with respect to one another between a receive position and a transfer position, the transfer rollers being above the runout rollers in the transfer position, the transfer rollers being horizontally shiftable with respect to the runout rollers between a runout table position and a cooling table position, the transfer rollers being interleaved with the runout rollers in the runout table position, the transfer rollers being not interleaved with the runout rollers in the cooling table position, the runout rollers and the transfer rollers adapted to receive and support a nonferrous extrusion from a press;
    a cooling table; and
    a control adapted to control the relative vertical shifting of the runout rollers and the transfer rollers, and further adapted to control the horizontal shifting of the transfer rollers, to enable the transfer rollers to transport the extrusion from the runout table to the cooling table.

12. A nonferrous extrusion handling system as defined in claim 11 wherein the cooling table includes belts for receiving the extrusion from the transfer rollers.

13. A nonferrous extrusion handling system as defined in claim 11 further comprising a puller adapted to pull the extrusion supported by the runout rollers and the transfer rollers.

14. A nonferrous extrusion handling system as defined in claim 11 further comprising a leadout table including leadout rollers horizontally aligned with at least one of the runout rollers and the transfer rollers in the receive position.

15. A nonferrous extrusion handling system as defined in claim 11 wherein the transfer rollers are vertically shiftable.

* * * * *